US012548583B2

(12) United States Patent
Enamito et al.

(10) Patent No.: US 12,548,583 B2
(45) Date of Patent: Feb. 10, 2026

(54) ACOUSTIC CONTROL APPARATUS, STORAGE MEDIUM AND ACCOUSTIC CONTROL METHOD

(71) Applicants: KABUSHIKI KAISHA TOSHIBA, Tokyo (JP); TOSHIBA DIGITAL SOLUTIONS CORPORATION, Kawasaki (JP)

(72) Inventors: Akihiko Enamito, Kawasaki Kanagawa (JP); Takahiro Hiruma, Tokyo (JP)

(73) Assignees: KABUSHIKI KAISHA TOSHIBA, Kawasaki (JP); TOSHIBA DIGITAL SOLUTIONS CORPORATION, Kawasaki (JP)

( * ) Notice: Subject to any disclaimer, the term of this patent is extended or adjusted under 35 U.S.C. 154(b) by 169 days.

(21) Appl. No.: 18/589,789

(22) Filed: Feb. 28, 2024

(65) Prior Publication Data

US 2025/0087229 A1 Mar. 13, 2025

(30) Foreign Application Priority Data

Sep. 8, 2023 (JP) ................................ 2023-146343

(51) Int. Cl.

*G10L 21/00* (2013.01)

*G10L 21/034* (2013.01)

(Continued)

(52) U.S. Cl.

CPC ........ *G10L 21/0364* (2013.01); *G10L 21/034* (2013.01)

(58) Field of Classification Search

None

See application file for complete search history.

(56) References Cited

U.S. PATENT DOCUMENTS

| | | | | |
|---|---|---|---|---|
| 4,506,380 | A | 3/1985 | Matsui et al. | |
| 11,310,598 | B2 * | 4/2022 | Enamito | G10L 25/51 |

(Continued)

FOREIGN PATENT DOCUMENTS

| | | | |
|---|---|---|---|
| EP | 4 322 154 | A1 | 2/2024 |
| JP | H4-273 | A | 1/1992 |

(Continued)

OTHER PUBLICATIONS

Tsutomu Kaizuka et al., "Radiation modes and acoustic field confined near acoustic sources," J. Acoustical Soc. of Am., vol. 146, No. 3, pp. EL299-EL305, DOI:10.1121/1.5126922 (2019).

*Primary Examiner* — Shreyans A Patel

(74) *Attorney, Agent, or Firm* — Finnegan, Henderson, Farabow, Garrett & Dunner, LLP

(57) ABSTRACT

According to one embodiment, an acoustic control apparatus includes a processor. The processor calculates acoustic filter coefficients which are smaller in number than a plurality of sound sources, based on a first relational expression between acoustic filters applied to a voice signal containing information of voice reproduced by each of the sound sources, which is based on a sound increase control law that increases voice pressure at a sound increase control point by voices reproduced by the sound sources, and a second relational expression between the acoustic filters, which is based on an acoustic power minimization control law that minimizes acoustic power for voices reproduced by the sound sources.

(Continued)

The processor applies the calculated acoustic filter coefficients to an input voice signal, and branch a voice signal to which a common acoustic filter coefficient is applied, into at least two of the sound sources.

10 Claims, 20 Drawing Sheets

(51) Int. Cl.
*G10L 21/0364* (2013.01)
*H04R 3/00* (2006.01)

(56) References Cited

U.S. PATENT DOCUMENTS

| | | | | |
|---|---|---|---|---|
| 12,327,064 | B2 * | 6/2025 | Enamito | G10L 15/22 |
| 2006/0215853 | A1 | 9/2006 | Hiruma et al. | |
| 2007/0098183 | A1 | 5/2007 | Enamito et al. | |
| 2012/0195447 | A1 | 8/2012 | Hiruma et al. | |
| 2013/0336490 | A1 | 12/2013 | Someda et al. | |
| 2014/0169595 | A1 | 6/2014 | Enamito et al. | |
| 2014/0177882 | A1 | 6/2014 | Hiruma et al. | |
| 2015/0248897 | A1 | 9/2015 | Nakayama et al. | |
| 2015/0350788 | A1 | 12/2015 | Someda et al. | |
| 2018/0350370 | A1 * | 12/2018 | Ding | H04L 12/1831 |
| 2023/0297323 | A1 * | 9/2023 | Enamito | G06F 3/167<br>704/275 |

FOREIGN PATENT DOCUMENTS

| | | | |
|---|---|---|---|
| JP | H5-153685 | A | 6/1993 |
| JP | H5-161192 | A | 6/1993 |
| JP | 3083296 | B2 | 9/2000 |
| JP | 2007-19980 | A | 1/2007 |
| JP | 4282139 | B2 | 6/2009 |
| JP | 4300194 | B2 | 7/2009 |
| JP | 4372081 | B2 | 11/2009 |
| JP | 4715052 | B2 | 7/2011 |
| JP | 4817804 | B2 | 11/2011 |
| JP | 2012-156865 | A | 8/2012 |
| JP | 2014-17813 | A | 1/2014 |
| JP | 2014-68266 | A | 4/2014 |
| JP | 2015-76797 | A | 4/2015 |
| JP | 5734928 | B2 | 6/2015 |
| JP | 2015-228571 | A | 12/2015 |
| JP | 2016-63318 | A | 4/2016 |
| JP | 2016-82443 | A | 5/2016 |
| JP | 5966897 | B2 | 8/2016 |
| JP | 2021-48468 | A | 3/2021 |
| JP | 2023-136981 | A | 9/2023 |
| WO | WO 2022/215109 | A1 | 10/2022 |

* cited by examiner

ACOUSTIC CONTROL APPARATUS, STORAGE MEDIUM AND ACCOUSTIC CONTROL METHOD

CROSS-REFERENCE TO RELATED APPLICATION

This application is based upon and claims the benefit of priority from prior Japanese Patent Application No. 2023-146343, filed Sep. 8, 2023, the entire contents of which are incorporated herein by reference.

FIELD

Embodiments described herein relate generally to an acoustic control apparatus, a storage medium and an acoustic control method.

BACKGROUND

Various services using voices are utilized. Examples are guidance using voices such as a voice guidance in a public space and a car navigation system, and a voice conversation using an online meeting system. Voices in these kinds of services are useful for a person who requires the guidance and a person who wants to have a conversation, but can be mere noise for a person who does not require the guidance and a person who does not want to have the conversation. That is, an area to which the voice is to be transmitted and an area to which the voice is not to be transmitted changes in accordance with a place using the service and a time zone. Accordingly, demands have arisen for an acoustic control technique that facilitates transmitting a sound in only a specific direction.

DETAILED DESCRIPTION

In general, according to one embodiment, an acoustic control apparatus includes a processor. The processor calculates acoustic filter coefficients which are smaller in number than a plurality of sound sources, based on a first relational expression between acoustic filters applied to a voice signal containing information of voice reproduced by each of the sound sources, which is based on a sound increase control law that increases voice pressure at a sound increase control point by voices reproduced by the sound sources, and a second relational expression between the acoustic filters, which is based on an acoustic power minimization control law that minimizes acoustic power for voices reproduced by the sound sources. The processor applies the calculated acoustic filter coefficients to an input voice signal, and branch a voice signal to which a common acoustic filter coefficient is applied, into at least two of the sound sources.

Embodiments will be described below with reference to the accompanying drawings.

First Embodiment

Figure 1:
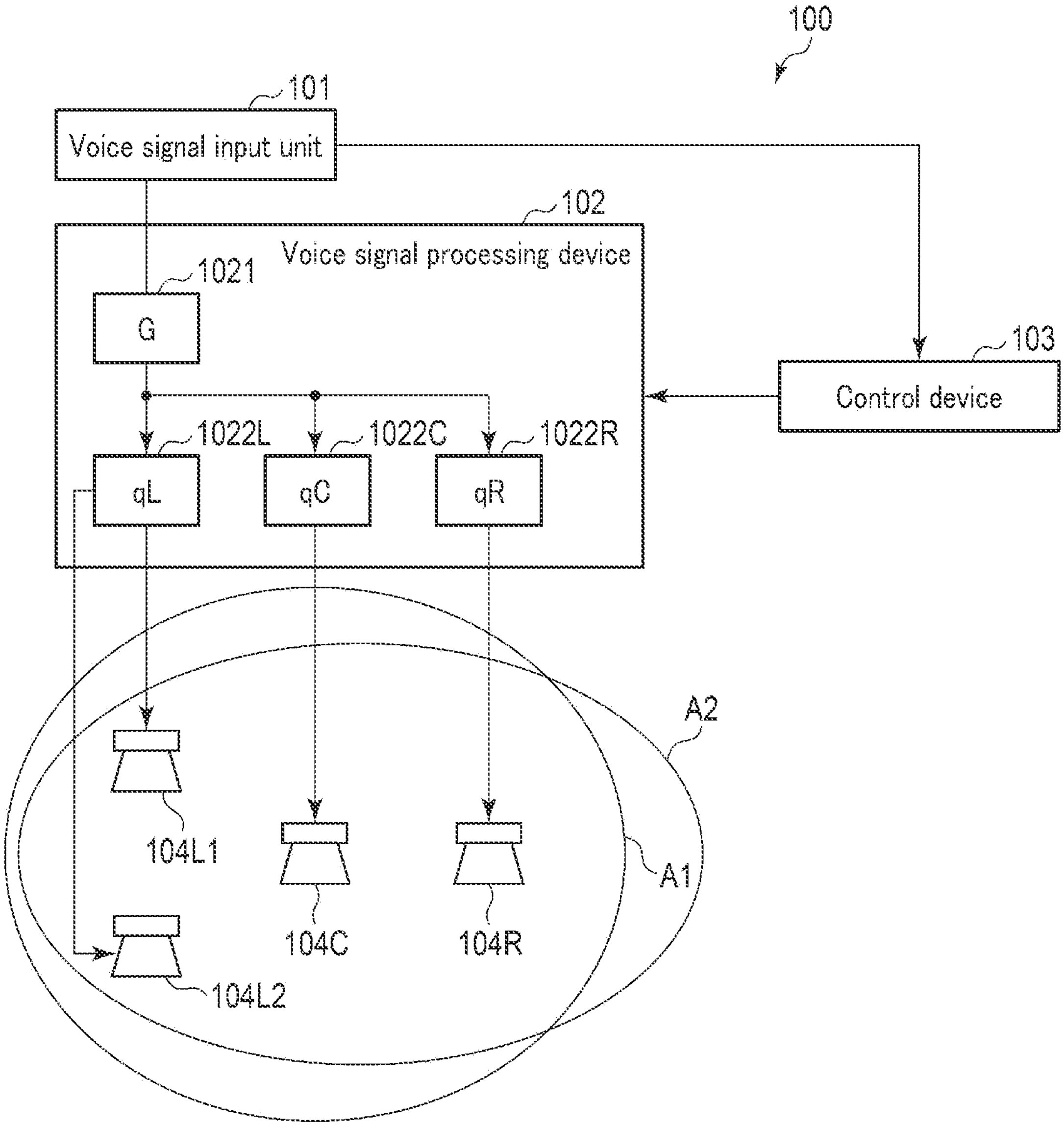
FIG. 1 is a diagram showing an example of the configuration of an acoustic control apparatus according to a first embodiment.
Figure 2:
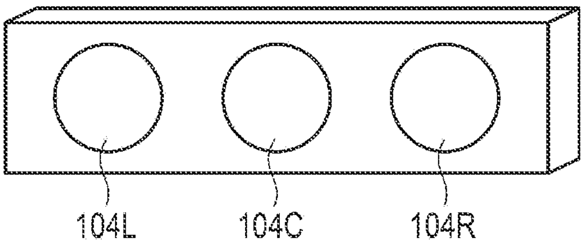
FIG. 2 is an external view showing an example of the configuration of a speaker.

A first embodiment will be described below. FIG. 1 is a diagram showing an example of the configuration of an acoustic control apparatus according to the first embodiment. An acoustic control apparatus 100 includes a voice signal input unit 101, a voice signal processing device 102, a control device 103 and speakers 104L1, 104L2, 104C and 104R. In the first embodiment, the speakers 104L1, 104L2, 104C and 104R are integrally held side by side in a horizontal case, for example, as shown in FIG. 2. The speakers 104L1 and 104L2 are vertically arranged close to each other so as to be symmetrical with respect to a straight line on which the speakers 104C and 104R are arranged. The speakers 104L1 and 104L2 can operate as one speaker that is virtually placed on the straight line. In FIG. 2, the speakers 104L1 and 104L2 are shown as one speaker 104L. In the following descriptions, the speakers 104L1 and 104L2 may be referred to as the speaker 104L.

The acoustic control apparatus 100 combines sound increase control and acoustic power minimization control using a plurality of speakers to silence a sound decrease area A1 around the speakers and facilitating transmission of sound to only a specific sound increase area A2. The sound increase control is to control the amplitudes of sounds emitted from the speakers to increase sound pressure in a specific direction. The acoustic power minimization control is to control the amplitudes and phases of sounds emitted from the speakers to minimize acoustic power when the speakers are regarded as one speaker.

The voice signal input unit 101 inputs a voice signal to the voice signal processing device 102. The voice signal input unit 101 may also input a voice signal to the control device 103. The voice signal contains sound information. The voice signal is prepared for the purpose of, e.g., playback. The voice signal may be generated each time playback is performed and may also be input by a user or the control device 103.

The voice signal processing device 102 processes the voice signal. The voice signal processing device 102 includes an amplifier 1021 and acoustic filters 1022L, 1022C and 1022R.

The amplifier 1021 amplifies the voice signal input from the voice signal input unit 101 using a gain G. The gain G may be a fixed value, e.g., 1 and may also be designated by the control device 103.

The acoustic filter 1022L filters the voice signal output from the amplifier 1021 in accordance with an acoustic filter coefficient qL designated by the control device 103. Then, the acoustic filter 1022L branches the filtered voice signal into signals and outputs them to the speakers 104L1 and 104L2. In this case, the speakers 104L1 and 104L2 generate sounds having the same amplitude and the same phase. The acoustic filter 1022C filters the voice signal output from the amplifier 1021 in accordance with an acoustic filter coefficient qC designated by the control device 103. Then, the acoustic filter 1022C outputs the filtered voice signal to the speaker 104C. The acoustic filter 1022R filters the voice signal output from the amplifier 1021 in accordance with an acoustic filter coefficient qR designated by the control device 103. Then, the acoustic filter 1022R outputs the filtered voice signal to the speaker 104R. These acoustic filters each transmit only the sound in a specific band of the voice signal. The acoustic filter coefficients qL, qC and qR can be set to be equal to the complex volume velocities of the speakers 104L, 104C and 104R.

The control device 103 calculates the acoustic filter coefficients qL, qC and qR to be given to the acoustic filters 1022L, 1022C and 1022R, based on the frequency of the voice signal and the interval between the speakers 104L, 104C and 104R. The control device 103 may set the gain G. The control device 103 will be described in detail later.

Each of the speakers 104L, 104C and 104R is a sound source for emitting sound corresponding to the filtered voice signal output from the corresponding acoustic filter. The speaker 104L operates as a left-side speaker, the speaker 104C operates as a center speaker, and the speaker 104R operates as a right-side speaker. In the configuration shown in FIG. 2, the interval between the speakers 104L, 104C and 104R is fixed. The speakers 104L, 104C and 104R need not always be arranged integrally as one unit. On the other hand, the speakers 104L, 104C and 104R are preferably arranged close to each other to some extent, for the purpose of acoustic power minimization control and sound increase control. In addition, the case shown in FIG. 2 may include the voice signal input unit 101, voice signal processing device 102 and control device 103. Interval d between the speakers 104L, 104C and 104R is determined according to a frequency band in which the sound increase control and acoustic power minimization control cause gradients of sound pressure levels.

Figure 3:
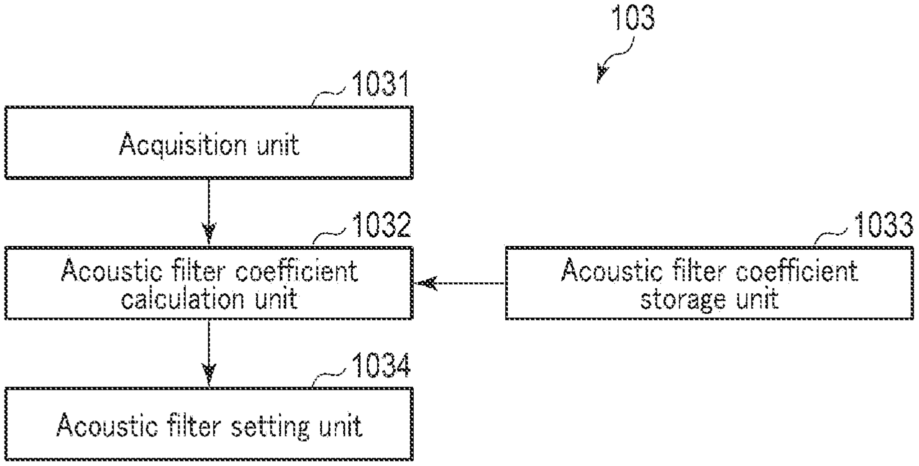
FIG. 3 is a block diagram showing elements included in the control apparatus.

The control device 103 will now be described. FIG. 3 is a block diagram showing elements included in the control device 103. The control device 103 includes an acquisition unit 1031, an acoustic filter coefficient calculation unit 1032, an acoustic filter coefficient storage unit 1033 and an acoustic filter setting unit 1034.

The acquisition unit 1031 acquires various types of information necessary to calculate an acoustic filter coefficient. Then, the acquisition unit 1031 supplies the acquired information to the acoustic filter coefficient calculation unit 1032. The information acquired by the acquisition unit 1031 contains, e.g., a frequency, speaker intervals and transfer functions.

The frequency is the frequency of a voice signal to be input from the voice signal input unit 101. The acquisition unit 1031 acquires information of the frequency from the voice signal input unit 101, for example. Note that the frequency can be converted into a wavenumber if sound velocity c is known. Since the wavenumber is used to calculate an acoustic filter coefficient, the acquisition unit 1031 may acquire information of the wavenumber from the voice signal input unit 101. In addition, if the frequency of the voice signal has a fixed value, the acquisition unit 1031 may supply information of the frequency having a prestored fixed value to the acoustic filter coefficient calculation unit 1032.

The speaker intervals are intervals between a plurality of speakers. The acquisition unit 1031 acquires the speaker intervals based on, e.g., user's input. The speaker intervals may be equal to each other or different from each other. Note that if the speakers are fixed, the speaker intervals can be handled as fixed values. In this case, the acquisition unit 1031 may supply information of speaker intervals having prestored fixed values to the acoustic filter coefficient calculation unit 1032.

The transfer functions are functions representing the transmission characteristics between a sound increase control point and the speakers 104L, 104C and 104R, and determined by the positional relationship between the sound increase control point and the speakers 104L, 104C and 104R. The sound increase control point is a control target position of the sound increase control. The transfer functions are represented by matrices containing, as elements, a spatial transmission characteristic CL of sound transmitted from the speaker 104L to the sound increase control point, a spatial transmission characteristic CC of sound transmitted from the speaker 104C to the sound increase control point and a spatial transmission characteristic CR of sound transmitted from the speaker 104R to the sound increase control point. The spatial transmission characteristics can be measured in, e.g., an anechoic room or audio-visual room having little sound reflection, from microphone acquisition signals obtained by radiating sounds based on a random signal or a time stretched pulse (TSP) signal from the speakers 104L, 104C and 104R and then collecting the sounds using a microphone placed at the sound increase control point. The acquisition unit 1031 acquires the transfer functions thus measured. Note that if the positions of the speakers 104L, 104C and 104R and the position of the sound increase control point are fixed, the transfer functions are handled as fixed transfer functions. In this case, the acquisition unit 1031 may supply prestored fixed transfer functions to the acoustic filter coefficient calculation unit 1032.

The acoustic filter coefficient calculation unit 1032 receives various types of information from the acquisition unit 1031 and receives the acoustic filter coefficient of at least one speaker from the acoustic filter coefficient storage unit 1033 to calculate acoustic filter coefficients of the remaining speakers. Then, the acoustic filter coefficient calculation unit 1032 supplies the acoustic filter coefficients to the acoustic filter setting unit 1034. The acoustic filter is calculated as given by the following equation (1) from a first relational expression and a second relational expression which are obtained based on sound increase control law and acoustic power minimization control law, respectively.

$$qC = 1 \tag{1}$$
$$qR = \frac{D_L \operatorname{sinc} kd_{LC} - (1-n)D_C}{D_L \operatorname{sinc} kd_{RL} - D_R} qC$$
$$qL = -\left(\frac{\sin kd_{LC}}{kd_{LC}} qC + \frac{\sin kd_{RL}}{kd_{RL}} qR\right)$$

In the equation (1), qC is the acoustic filter coefficient of the speaker 104C, qR is the acoustic filter coefficient of speaker 104R and qL is the acoustic filter coefficient of the speaker 104L. In addition, n is the multiplication factor of sound pressure energy by the sound increase control. DL is a transfer function between the sound increase control point and the speaker 104L, DC is a transfer function between the sound increase control point and the speaker 104C, DR is a transfer function between the sound increase control point and the speaker 104R. In addition, k is a wavenumber, c is the sound velocity, dLC is an interval between the speakers 104L and 104C, dRL is an interval between the speakers 104L and 104R, and dCR is an interval between the speakers 104C and 104R.

The acoustic filter coefficient storage unit 1033 stores the acoustic filter coefficient of at least one of the speakers 104L, 104C and 104R. For example, the acoustic filter coefficient storage unit 1033 stores the acoustic filter coefficient of the speaker 104C. The acoustic filter coefficient storage unit 1033 can be installed if the number of speakers is three or more. If the number of speakers is l (l≥3), the acoustic filter coefficient storage unit 1033 stores at least (l−2) acoustic filter coefficients. In the first embodiment, the speakers 104L1 and 104L2 are regarded as one speaker 104L, as described above. In this case, the acoustic filter coefficient storage unit 1033 has only to store one acoustic filter coefficient, e.g., the acoustic filter coefficient of the speaker 104C.

The acoustic filter setting unit 1034 sets the acoustic filter coefficients, which are calculated by the acoustic filter coefficient calculation unit 1032, to their respective On the basis of the sound increase control law, the amount of sound increase is determined by the superposition of sounds from the sound source. If, therefore, the number of sound sources increases, the sound increase effect is improved. In the first embodiment, two speakers 104L1 and 104L2 function as one left-side speaker 104L. The sound increase effect can thus be improved more than the fact that one speaker is caused to have the function of the left-side speaker.

On the basis of the acoustic power minimization control law, the amount of reduction in acoustic power is determined by the sum of amounts of reduction in acoustic power among sound sources. Even if the total volume velocities of the sound sources are the same, the two divided sound sources increase a new sum (radiation resistance), with the result that the advantage of reduction in acoustic power increases.

That is, since the left-side speaker is divided into two speakers 104L1 and 104L2, both the advantages of sound increase control and acoustic power minimization control will be improved.

Figure 4:
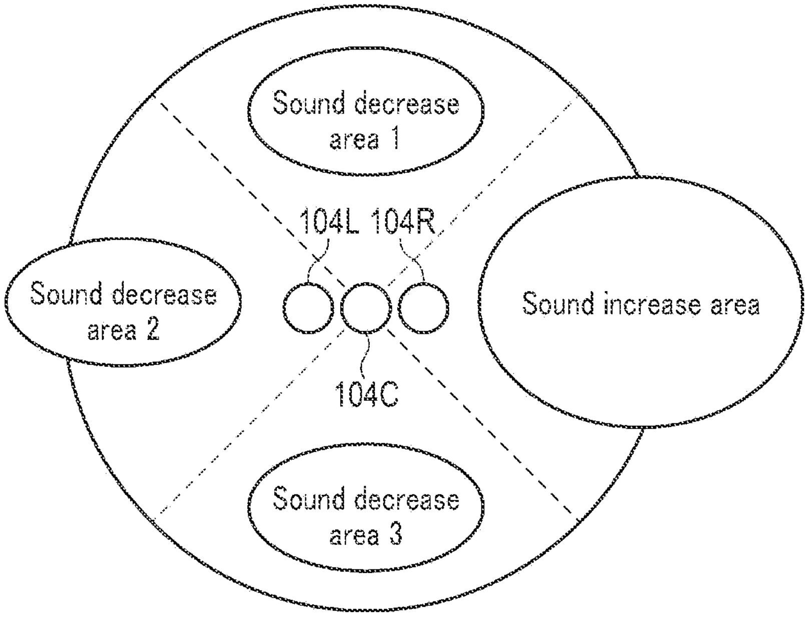
FIG. 4 is a diagram showing an example of setting a sound increase area and sound decrease areas.

FIG. 4 is a diagram showing an example of setting of a sound increase area and sound decrease areas. In FIG. 4, the sound increase area is set to the right of the speakers 104L, 104C and 104R arranged side by side. In this arrangement, the sound decrease areas are set in front of, at the back of and to the left of the speakers 104L, 104C and 104R. In FIG. 4, a sound reduction area 1 is set in front of the speakers 104L, 104C and 104R, a sound decrease area 2 is set to the left of the speakers 104L, 104C and 104R, and a sound reduction area 3 is set at the back of the speakers 104L, 104C and 104R.

Figure 5:
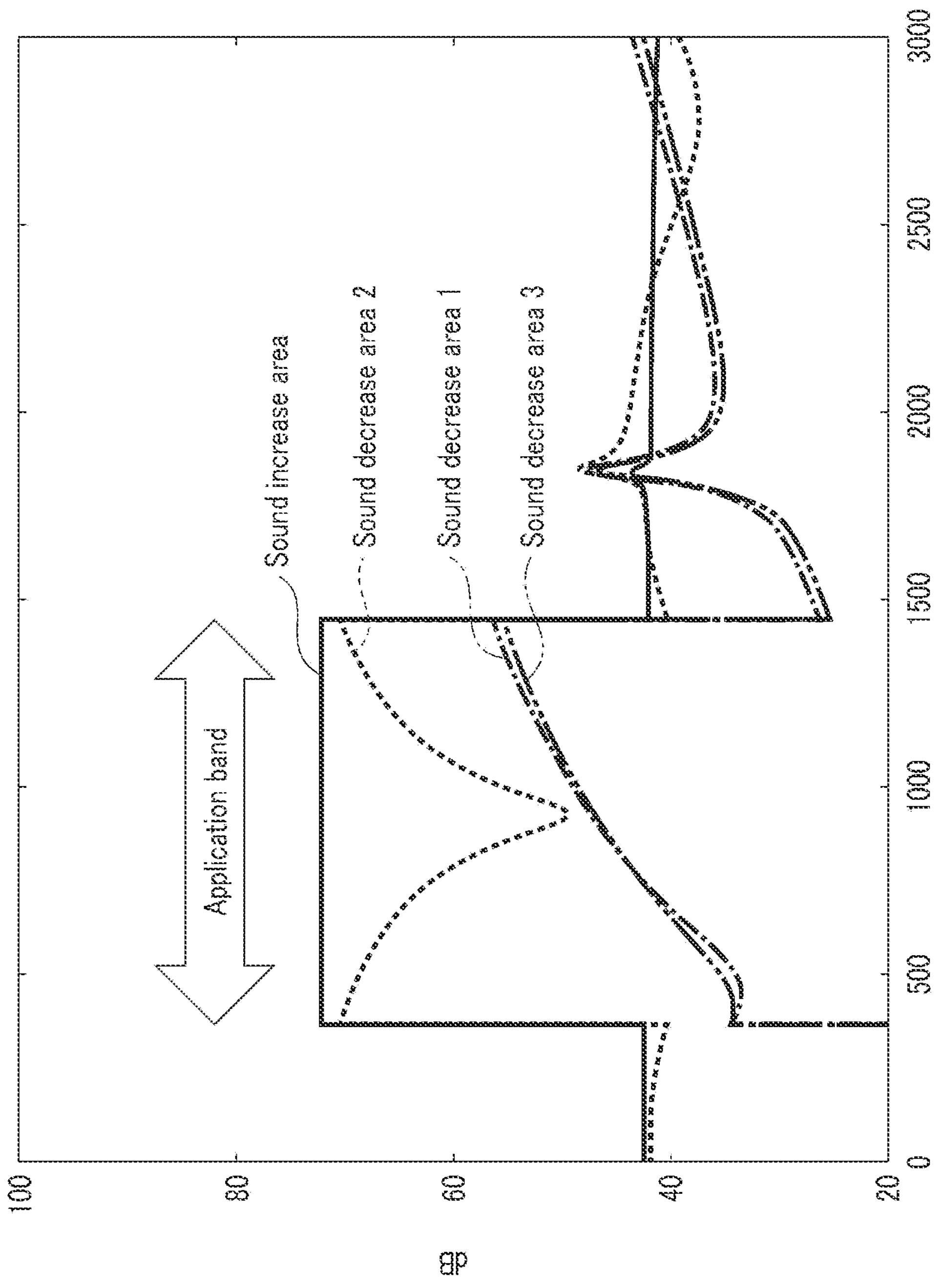
FIG. 5 is a graph showing calculation results of the relationship between a frequency and a sound pressure level in the sound increase area and sound decrease areas.

FIG. 5 is a diagram showing calculation results of the relationship between a frequency and a sound pressure level in the sound increase and decrease areas. In FIG. 5, the horizontal axis indicates the frequency, and the vertical axis indicates the sound pressure levels in the sound increase area and the sound decrease areas 1, 2 and 3. In FIG. 5, the speaker interval is 0.1 m. In each of the sound increase area and sound decrease areas 1, 2 and 3, the sound pressure level of sound collected by a microphone placed 0.5 m away from the speaker 104C is calculated. FIG. 5 also shows a state in which the change of the sound pressure level is emphasized by multiplying a gain by the sound pressure level in an applied band that is a frequency band in which the advantage of acoustic power reduction becomes particularly great, based on the principle of the acoustic power minimization control. The applied band is determined based on the speaker interval. If the speaker interval is, for example, 0.1 m, the applied band is 400 Hz to 1250 Hz in a ⅓ octave band. In obtaining the calculation results shown in FIG. 5, the positions of the sound decrease areas 1 and 3 are slightly shifted by adjusting the arrangement of the speakers, instead of being in the front and rear positions relative to the speakers. This is to make a difference between the calculation results of the sound decrease areas 1 and 3. If the positions of the sound decrease areas 1 and 3 are symmetrical with regard to the speakers, the calculation results of the sound decrease areas 1 and 3 coincide with each other in theory.

As shown in FIG. 5, the sound pressure level in the sound increase area is almost constant in a band from 400 Hz to 1250 Hz. In contrast, the sound pressure level in the sound decrease areas 1 and 3 is lower than that in the sound increase area in the band from 400 Hz to 1250 Hz, and in particular, it is significantly low around 400 Hz. In addition, the sound pressure level in the sound decrease area 2 located at a position symmetrical to the sound increase area with regard to the speakers decreases less than that in the sound decrease areas 1 and 3, but decreases more than that in the sound increase area from 400 Hz to 1250 Hz, and greatly decreases especially at around 700 Hz. The reason why the decrease in sound pressure level in the sound decrease area 2 is less than that in the sound decrease areas 1 and 3 is that the interference of sounds emitted from the speakers 104L and 104R in the sound decrease areas 1 and 3 is large. Under the acoustic power minimization control, if the sound pressure level decreases at a certain point, it increases at another point. It is in the sound decrease area 2 where the sound pressure level increases. On the other hand, in the first embodiment, a sufficient decrease in sound pressure level can be ensured even in the sound decrease area 2 compared to the sound increase area.

Figure 6:
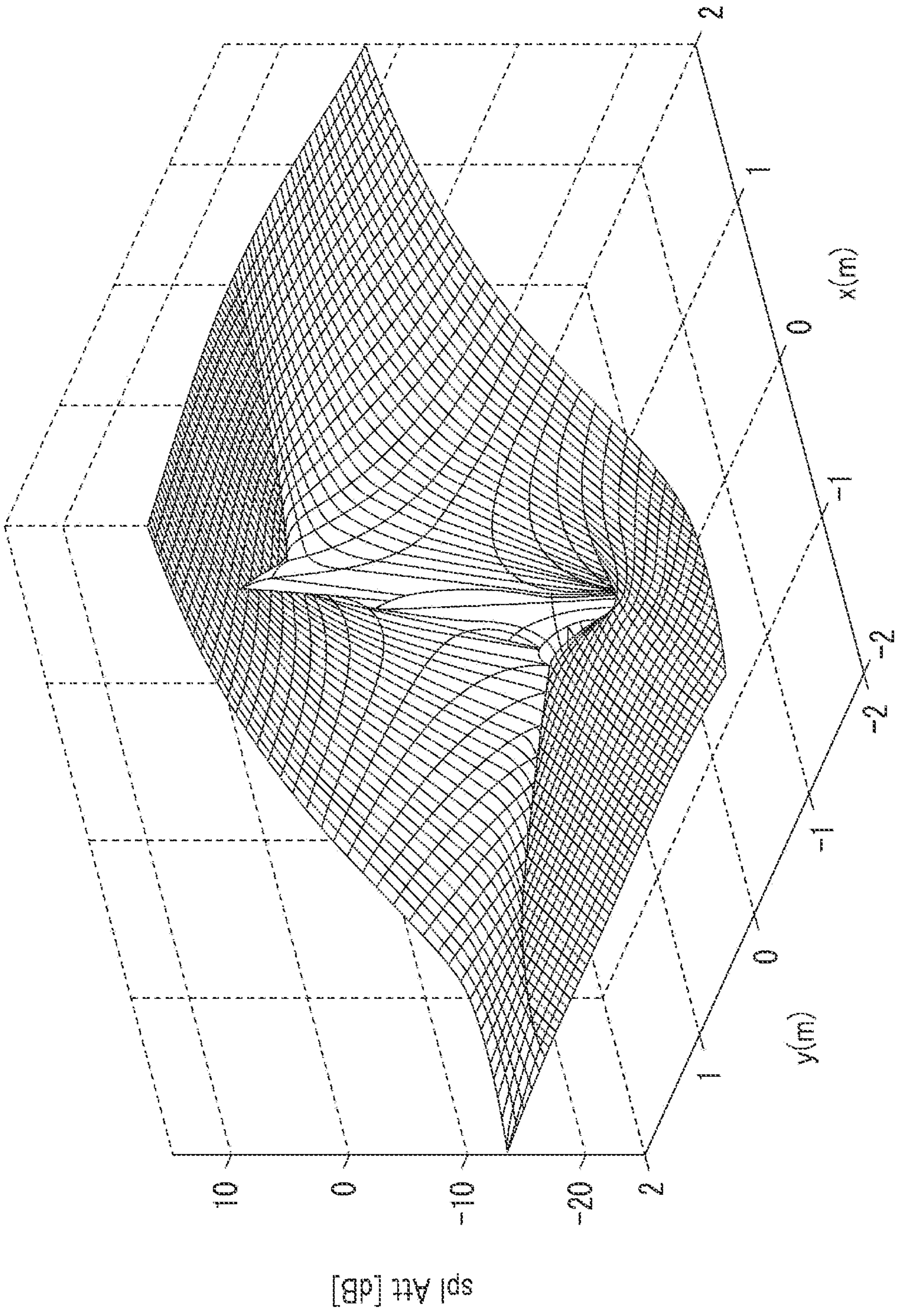
FIG. 6 is a diagram showing gradients of sound pressure levels of the sound increase area and sound decrease areas when sound is radiated using acoustic filter coefficients set in accordance with the results of equation (1).

FIG. 6 shows gradients of the sound pressure levels of the sound increase and decrease areas when sound is radiated using the acoustic filter coefficients set in accordance with the results of equation (1). FIG. 6 also shows an example in which the interval between the speakers is 0.1 m and the frequency of sound to be radiated is 700 Hz. In FIG. 6, the x and y axes represent distances from the origin that is the position of the speaker 104C, for example. In FIG. 6, the vertical axis represents the sound pressure level.

As shown in FIG. 6, an area where the sound pressure level is particularly high, for example, an area where $+0.75 \leq x \leq +1$ and $0 \leq y \leq 0.5$ (both units are meters) is a sound increase area. On the other hand, an area other than the sound increase area shown in FIG. 6 is a sound decrease area. As shown in FIG. 5, under the conditions of the speaker interval of 0.1 m and the frequency of 700 Hz, a difference in sound pressure level between the sound increase and decrease areas becomes large, with the result that a large gradient of sound pressure level is created in a narrow area of 2 m×2 m, for example.

Figure 7:
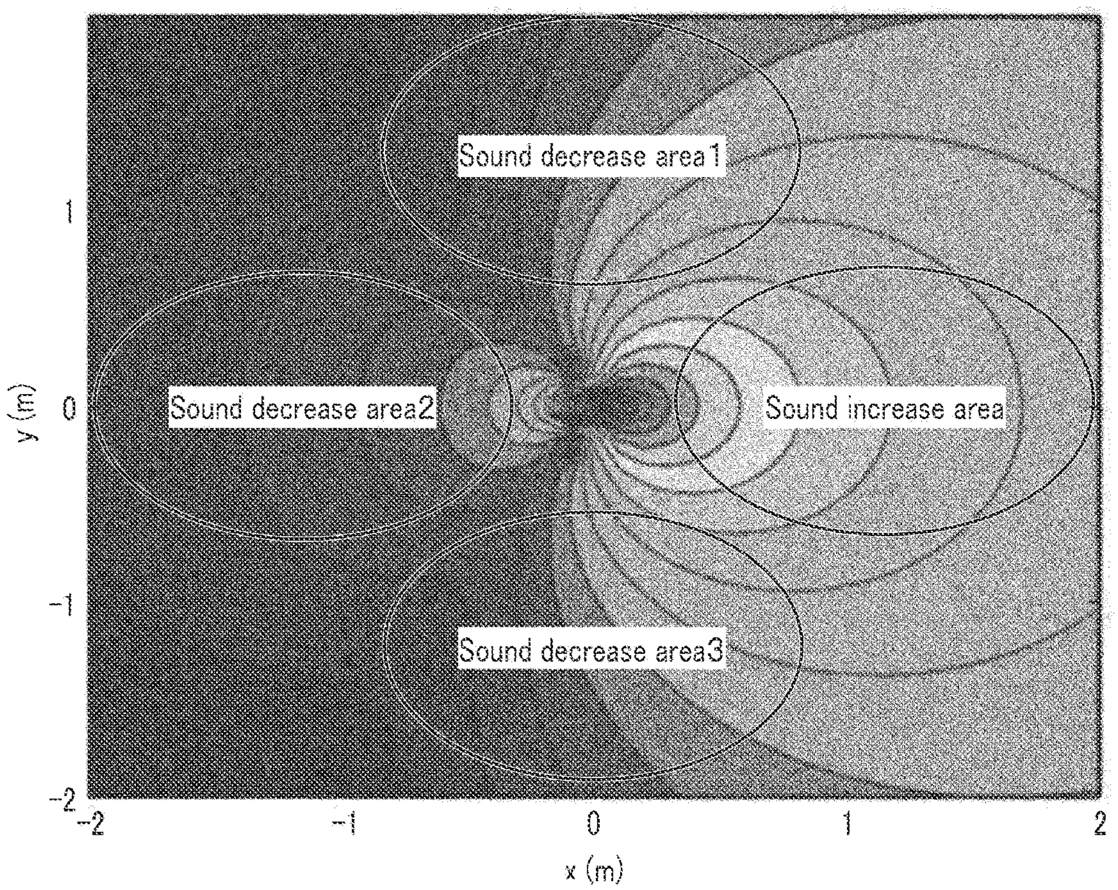
FIG. 7 is a diagram showing an example of distribution of sound pressure levels in each of the sound increase and decrease areas when sound is radiated using the acoustic filter coefficients set in accordance with the results of equation (1).

FIG. 7 shows an example of the distribution of sound pressure levels in each area when sound is radiated with the acoustic filter coefficients set in accordance with the results of the equation (1). In the example of FIG. 7, the speaker interval is 0.1 m and the frequency of sound to be emitted is 700 Hz. The distribution in FIG. 7 indicates that the sound pressure level varies according to the concentration.

As shown in FIG. 7, the sound pressure level in the sound increase area increases, and the sound pressure levels in the sound decrease areas 1, 2 and 3 decrease. If the sound decrease areas 1, 2 and 3 are compared with one another, the amount of decrease in sound pressure level in the sound decrease areas 1 and 3 is larger than that in the sound decrease area 2. With reference to the speaker 104C, the sound of the speaker 104R and that of the speaker 104L have an antiphase relationship. Accordingly, in the sound decrease areas 1 and 3, the acoustic power reduction due to the interference of sounds emitted from the speakers 104L and 104R is greater than that in the sound decrease area 2.

As described above, in the first embodiment, the sound increase control and the acoustic power minimization control are combined. Thus, a sudden sound pressure difference can be made between the sound increase and decrease areas. In the first embodiment, the left-side speaker is divided into speakers that emit sounds of the same amplitude and the same phase. Therefore, the advantages of the sound increase control and acoustic power minimization control is improved more than those of the sound increase control and acoustic power minimization control in the case where the number of speakers and the number of acoustic filter coefficients are the same.

The configuration of the first embodiment also has advantages in terms of commercial materials and implementation. That is, in the first embodiment, great advantages of sound increase control and acoustic power minimization control can be expected because the number of speakers is increased while maintaining the number of acoustic filter coefficients, namely, the number of control channels of the speakers. Since the number of control channels can be decreased, the configuration can be simplified. If the speaker interval is constant, the number of speakers is increased to improve the advantages of sound increase control and acoustic power minimization control, in other words, the speaker interval can be shortened if the number of speakers is the same with the advantages of sound increase control and acoustic power minimization control. If, therefore, a voice signal filtered by the same acoustic filter coefficient is branched into two speakers to perform sound increase control and acoustic power minimization control as in the first embodiment, the speaker interval can be shortened compared with a configuration in which a voice signal filtered by the same number of acoustic filter coefficient as the number of speakers is input to a separate speaker. This results in system miniaturization.

In the first embodiment, the left-side speaker 104L is divided into the speakers 104L1 and 104L2. The voice signal processing device 102 branches a voice signal to which the acoustic filter coefficient qL is applied, into the speakers 104L1 and 104L2. The left-side speaker may be divided into three or more speakers. In this case, the voice signal processing device 102 may branch a voice signal to which the acoustic filter coefficient qL is applied, into three or more speakers.

Modification 1 to First Embodiment

As described above, in the sound increase control and acoustic power minimization control in the first embodiment, the amount of decrease in the sound pressure level of the sound decrease area 2 that is symmetrical to the sound increase area with reference to the speakers is smaller than that of the sound decrease areas 1 and 3.

If a phase shifter is located, for example, at a stage preceding the acoustic filters 1022L, 1022C and 1022R to shift the phase of a voice signal and thus increase the amount of decrease in the sound pressure level in the sound decrease area 2 that is symmetrical to the sound increase area. In this case, the phase of the voice signal input to the acoustic filter 1022L is, for example, 240 degrees, the phase of the voice signal input to the acoustic filter 1022C is, for example, 0 degrees, and the phase of the voice signal input to the acoustic filter 1022R is, for example, 120 degrees. As the phase of the voice signal is shifted by 120 degrees by the phase shifter, the phase of sound emitted from each of the speakers 104L, 104C and 104R is also shifted by 120 degrees. Accordingly, the sound emitted from the speakers 104L, 104C and 104R becomes a traveling wave and flows toward the sound increase area, for example. Then, the sound pressure interference in the sound decrease areas 1 and 3 is reduced. As a result, the amount of decrease in the sound pressure level in the sound decrease area 2 becomes large.

In addition, instead of phase correction to the voice signal, the gain of a voice signal input to the speaker nearest to the sound increase control point is further lowered to obtain an advantage equivalent to that in the phase correction. In the example of FIG. 1, if the gain of a voice signal input to the acoustic filter 1022R is made much lower than G, an advantage equivalent to that in shifting the phase of the video signal can be obtained.

Modification 2 to First Embodiment

In the first embodiment, four speakers are used for the sound increase control and acoustic power minimization control. However, the number of speakers is not limited to four. If there are three or more speakers, the number of sound increase control points can be set to two or more. Specifically, if the number of speakers is l, the number of sound increase control points may be set to at most (l−1).

Figure 8:
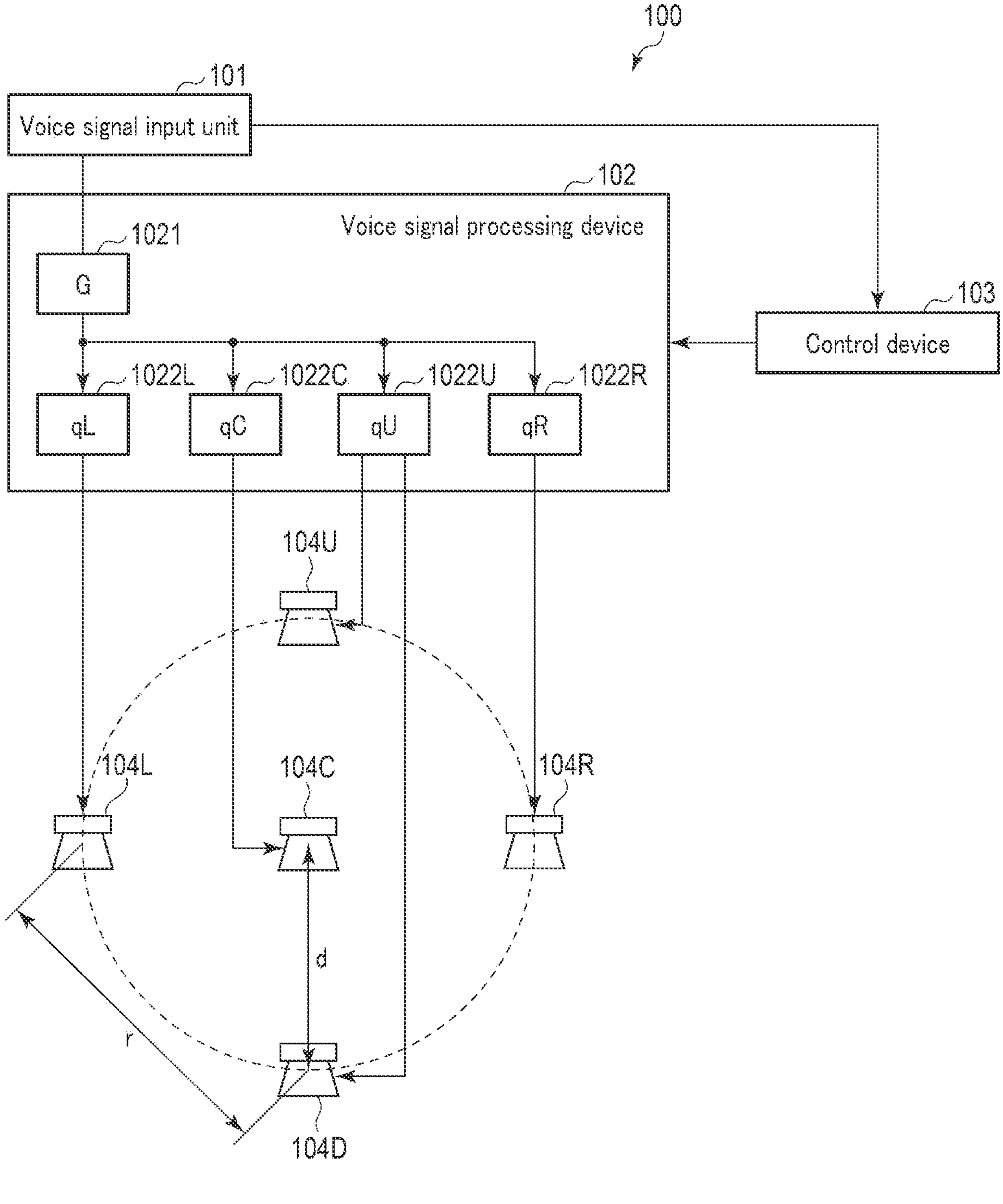
FIG. 8 is a diagram showing an example of the configuration of an acoustic control apparatus according to modification 2 of the first embodiment.

FIG. 8 is a diagram showing an example of the configuration of an acoustic control apparatus according to modification 2 to the first embodiment. In the example of FIG. 8, four speakers are arranged at an equal distance from a centrally located speaker 104C, that is, on a circumference with the speaker 104C centered. More specifically, a speaker 104R is located in an azimuth angle of 0° with the speaker 104C centered, a speaker 104U is located in an azimuth angle of 90°, a speaker 104L is located in an azimuth angle of 180° and a speaker 104D is located in an azimuth angle of 270°. At this time, the sound increase control points may be set at two positions of azimuth angles of 0° and 180°. If the multiplication factor of the sound increase control is smaller than 1, the sound pressure at the sound increase control point can be reduced. If, therefore, the sound increase control point is 2 or more, sound is increased for the sound increase control point of the azimuth angle of 0°, and sound is increased for the sound increase control point of the azimuth angle of 180°. Hereinafter, the sound increase control point at which sound is actively decreased will be referred to as a sound decrease control point. The sound increase control point of the azimuth angle of 180° will be referred to as a sound decrease control point.

In the example of FIG. 8, the voice signal processing device 102 includes an acoustic filter 1022U in addition to the acoustic filters 1022L, 1022C and 1022R. The acoustic filter 1022U filters a voice signal output from the amplifier 1021 in accordance with the acoustic filter coefficient qU designated by the control device 103. Then, the acoustic filter 1022U branches the filtered voice signal into the speakers 104U and 104D. In this case, the speakers 104U and 104D emit sounds of the same amplitude and the same phase.

If four speakers are arranged on a circumference with the speaker 104C centered, the acoustic filter coefficients qL, qC, qR and qU are each calculated as give by the following equation (2).

$$qC = 1 \tag{2}$$

$$qR = \frac{C \cdot D - A \cdot F}{B \cdot F - C \cdot E} qC$$

$$qU = \frac{A \cdot E - B \cdot D}{B \cdot F - C \cdot E} qC$$

$$qL = -\left( \frac{\sin(kd)}{kd} qC + \frac{\sin(2kd)}{2kd} qR + \frac{\sin(kr)}{kr} qU \right)$$

$$A = (1 - n) D_{C1} - \mathrm{sinc}(kd) D_{L1}$$

$$B = D_{R1} - \mathrm{sinc}(2kd) D_{L1}$$

$$C = 2D_{U1} - \mathrm{sinc}(kr) D_{L1}$$

$$D = (1 - m) D_{C2} - \mathrm{sinc}(kd) D_{L2}$$

$$E = D_{R2} - \mathrm{sinc}(2kd) D_{L2}$$

$$C = 2D_{U2} - \mathrm{sinc}(kr) D_{L2}$$

In the above equation (2), n is a multiplication factor of sound pressure energy at a first sound increase control point, for example, a sound increase control point at the azimuth angle of 0°, and m is a multiplication factor of sound pressure energy at a second sound increase control point, for example, a sound decrease control point at the azimuth angle of 180°. In the equation (2), DL1 is a transfer function between the first sound increase control point and the speaker 104, DL2 is a transfer function between the second sound increase control point and the speaker 104L, DC1 is a transfer function between the first sound increase control point and the speaker 104C, DC2 is a transfer function between the second sound increase control point and the speaker 104C, DR1 is a transfer function between the first sound increase control point and the speaker 104R, DR2 is a transfer function between the second sound increase control point and the speaker 104R, DU1 is a transfer function between the first sound increase control point and the speaker 104U, and DU2 is a transfer function between the second sound increase control point and the speaker 104U. Furthermore, in the equation (2), d is an interval between the speaker 104C and each of the speakers 104R, 104L and 104U and corresponds to the radius of a circle in which the speakers 104R, 104L and 104U are arranged, r is an interval between the speakers 104U and 104L, an interval between the speakers 104U and 104R, an interval between the speakers 104D and 104L and an interval between the speakers 104D and 104R.

Figure 9:
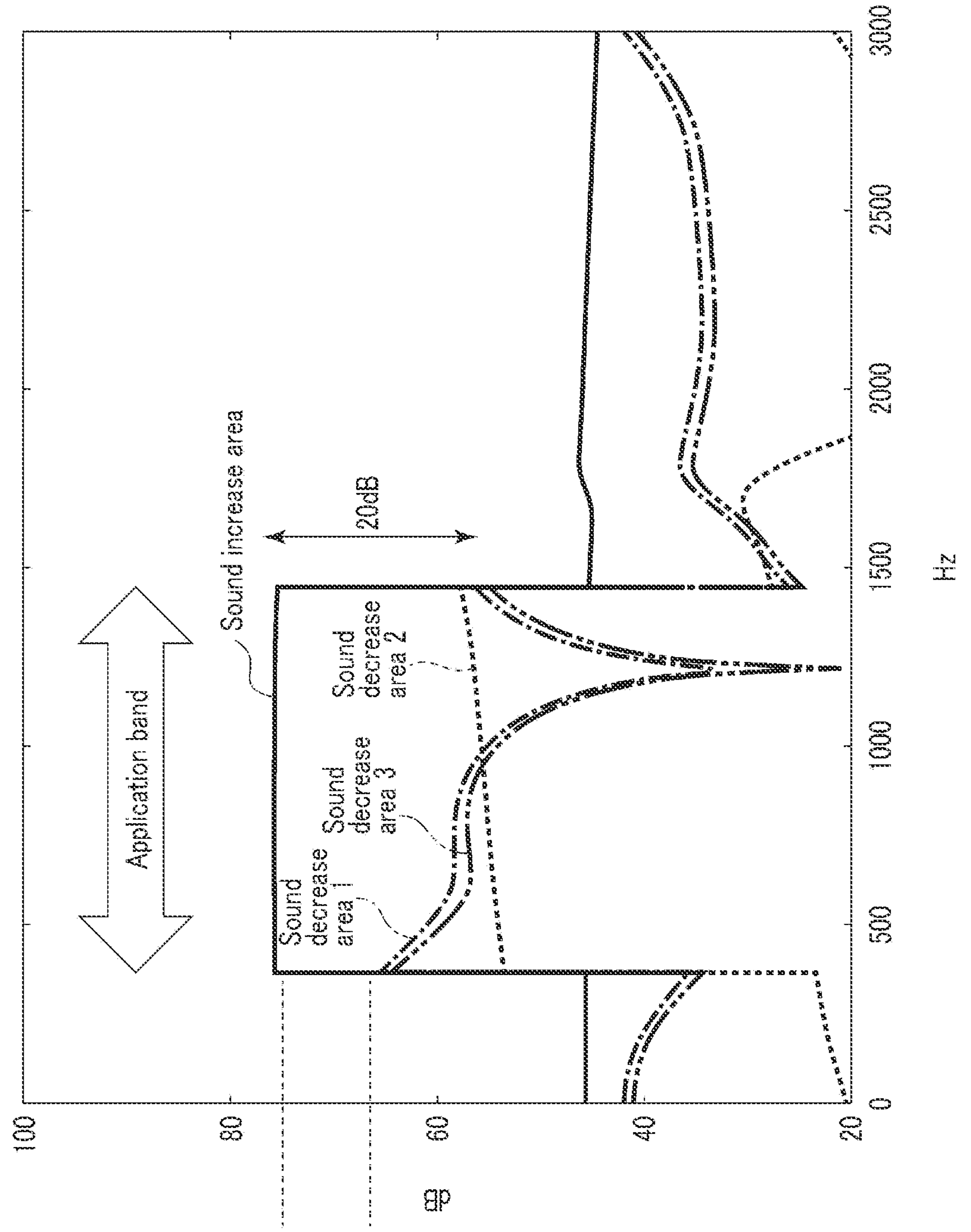
FIG. 9 is a graph showing calculation results of the relationship between a frequency and a sound pressure level when a sound increase area and sound decrease areas are set in the configuration of FIG. 8, as in FIG. 4.

FIG. 9 is a graph showing calculation results of the relationship between a frequency and a sound pressure level when a sound increase area and sound decrease areas are set in the configuration of FIG. 8, as in FIG. 4. In obtaining the calculation results shown in FIG. 9, a sound increase control point is set in the sound increase area shown in FIG. 4, and a sound decrease control point is set in a sound decrease area 2. The multiplication factor n of the sound increase control point is 3. The multiplication factor m of the sound decrease control point is 0.25. The speaker interval d is 0.1 m, and the speaker interval r is 0.14 m. FIG. 9 also shows a state in which a change in sound pressure level at 400 Hz to 1250 Hz is emphasized in a ⅓ octave band that is an application band.

Compare FIG. 9 and FIG. 5. In FIG. 9, the sound pressure level varies uniformly in the sound decrease area 2 regardless of the frequency. In FIG. 9, a difference in sound pressure level between the sound increase area and the sound decrease area 2 is about 20 dB in the application band of 400 Hz to 1250 Hz. In the sound decrease areas 1 and 3, the sound pressure level rapidly decreases at a specific frequency, that is, the sound pressure level varies in a notch characteristic manner. In the application band of 400 Hz to 1250 Hz, a difference in sound pressure level between the sound increase area and the sound decrease areas 1 and 3 is 15 dB or less. Since, in FIG. 5, the amount of decrease in the sound pressure level of the sound decrease area 2 in a band of around 400 Hz and in a band of around 1250 Hz is small, the advantages of the sound increase control and acoustic power minimization control in FIG. 9 are said to be greater than those of the sound increase control and acoustic power minimization control in FIG. 5. Furthermore, in FIG. 9, the sound pressure level decreases in the sound decrease areas 1, 2 and 3 even in a band exceeding the application band of 1250 Hz. That is, in the configuration of modification 2, a certain degree of advantage of sound increase control and acoustic power minimization control can be obtained even outside the application band. That is, as in the configuration of modification 2, the advantages of the sound increase control and acoustic power minimization control can be improved by further increasing the number of speakers.

Modification 3 to First Embodiment

Figure 10:
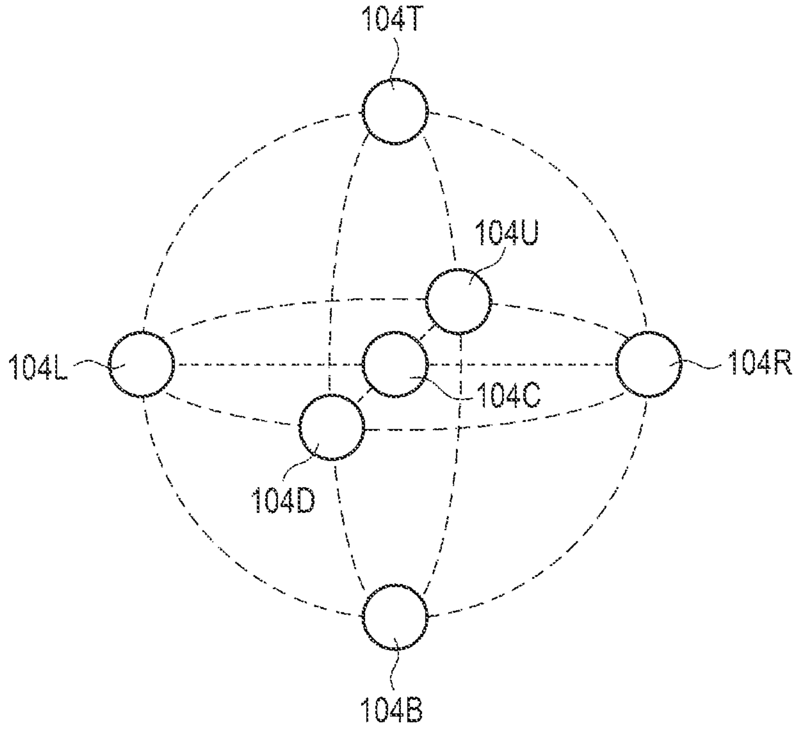
FIG. 10 is a diagram showing a modification in which speakers are arranged on a sphere.

In modification 2 of the first embodiment, the speakers are arranged in a two-dimensional shape. However, the speakers may be arranged in a three-dimensional shape, for example, at the center of a sphere and on the sphere as illustrated in FIG. 10. Alternatively, the speakers may be arranged, for example, at the center of a polyhedron and at vertexes of the polyhedron. The polyhedron is, for example, a regular polyhedron and a truncated polyhedron.

For example, in the arrangement of FIG. 10, in addition to the arrangement of FIG. 8, a speaker 104T is further located with interval d above the speaker 104C in the vertical direction and a speaker 104B is located with interval d under the speaker 104C in the vertical direction. In the configuration of FIG. 10, the speaker 104C is supplied with a voice signal filtered by an acoustic filter coefficient qC, the speaker 104R is supplied with a voice signal filtered by an acoustic filter coefficient qR, and the speaker 104L is supplied with a voice signal filtered by an acoustic filter coefficient qL. In addition, the speaker 104U is supplied with a voice signal filtered by an acoustic filter coefficient qU, and the speaker 104D is supplied with a voice signal filtered by an acoustic filter coefficient qD. Alternatively, a voice signal that is filtered by the acoustic filter coefficient qU is branched into the speakers 104U and 104D. The speaker 104T is supplied with a voice signal filtered by an acoustic filter coefficient qT, and the speaker 104B is supplied with a voice signal filtered by an acoustic filter coefficient qB. Alternatively, a voice signal that is filtered by the acoustic filter coefficient qT is branched into the speakers 104T and 104B. The acoustic filter coefficients qC, qR, qL, qU, qD, qT and qB can be calculated based on the sound increase control law and acoustic power minimization control law as in the first embodiment and modification 1.

Second Embodiment

A second embodiment will be described below. In the first embodiment, a voice signal filtered by a common acoustic filter is branched and input to a plurality of speakers to simplify the system and improve the advantages of sound increase control and acoustic power minimization control. The second embodiment is directed to an example in which a plurality of speaker groups are spaced to improve the directivity of sound to the sound increase area.

Figure 11:
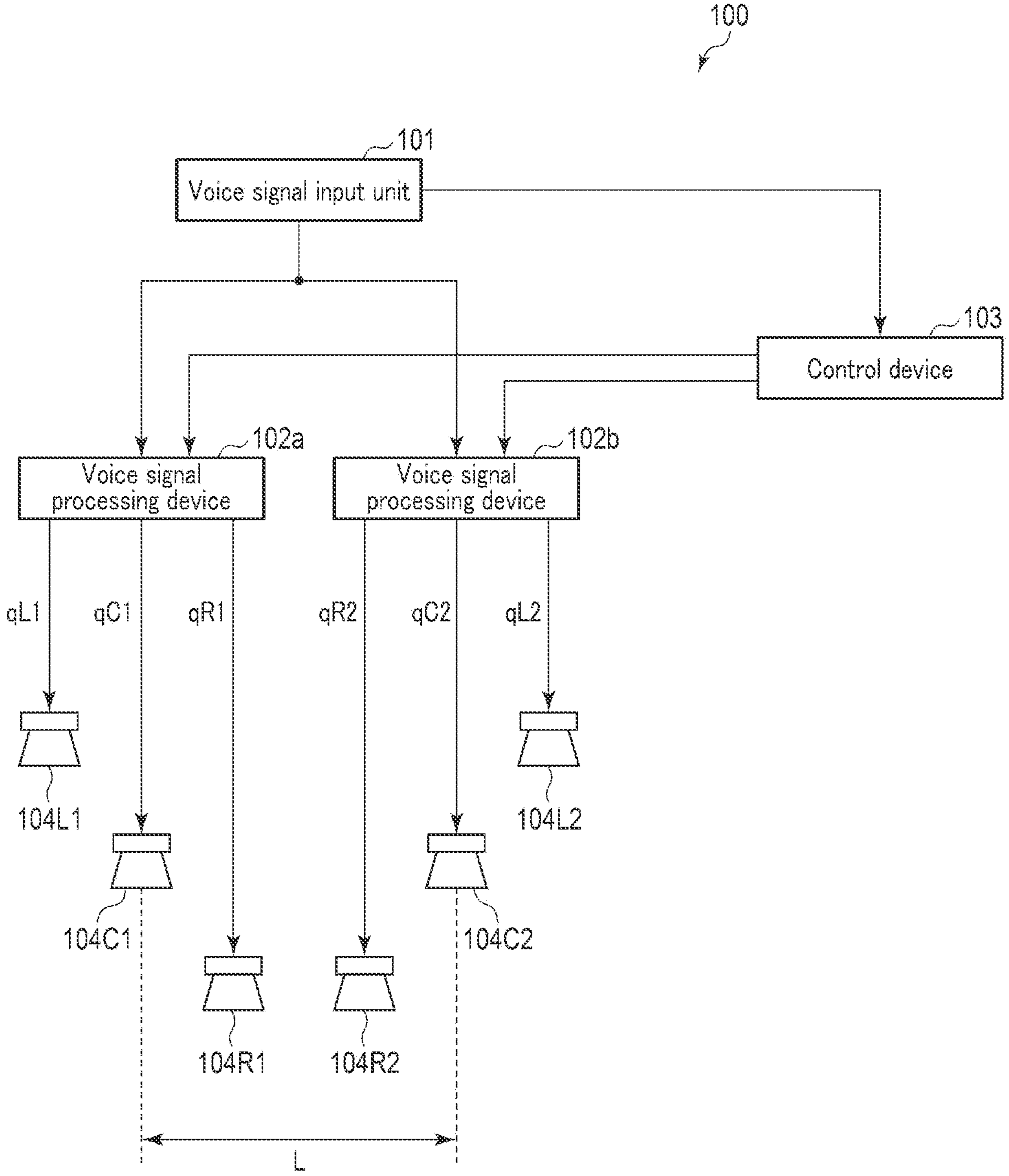
FIG. 11 is a diagram showing an example of the configuration of an acoustic control apparatus according to a second embodiment.

FIG. 11 is a diagram showing an example of the configuration of an acoustic control apparatus according to the second embodiment. The acoustic control apparatus 100 includes a voice signal input unit 101, voice signal processing devices 102*a* and 102*b*, a control device 103, a first speaker group and a second speaker group.

The first speaker group includes speakers 104L1, 104C1 and 104R1 arranged on a straight line. Similarly, the second speaker group includes speakers 104L2, 104C2 and 104R2 arranged on a straight line. The sound increase control point of the first speaker group is set alongside the speaker 104R1 on a straight line where the speakers 104L1, 104C1 and 104R1 are arranged. The sound increase control point of the second speaker group is set alongside the speaker 104R2 on a straight line where the speakers 104L2, 104C2 and 104R2 are arranged.

In the first speaker group, the speakers 104R1, 104C1 and 104L1 are arranged in this order from the front to the rear. In the second speaker group, the speakers 104R2, 104C2 and 104L2 are arranged in this order from the front to the rear. The interval between the speakers 104R1 and 104R2, the interval between the speakers 104C1 and 104C2, and the interval between the speakers 104L1 and 104L2 become longer in this order. In other words, the first and second speaker groups are arranged obliquely from the front toward the rear. In the following, the interval between the speakers 104C1 and 104C2 may be referred to as distance L between the first and second speaker groups. If the first and second speaker groups are spaced apart as shown in FIG. 11, the sound increase areas of the two speaker groups intersect.

The voice signal processing device 102*a* has the same configuration as that of the voice signal processing device 102 shown in FIG. 3 to filter the voice signal received from the voice signal input unit 101 in accordance with the acoustic filter coefficients qL1, qC1 and qR1 designated by the control device 103. Then, the voice signal processing device 102*a* outputs the voice signal filtered by the acoustic filter coefficient qL1 to the speaker 104L1, outputs the voice signal filtered by the acoustic filter coefficient qC1 to the speaker 104C1 and outputs the voice signal filtered by the acoustic filter coefficient qR1 to the speaker 104R1.

The voice signal processing device 102*b* has the same configuration as that of the voice signal processing device 102 shown in FIG. 3 to filter the voice signal received from the voice signal input unit 101 in accordance with the acoustic filter coefficients qL2, qC2 and qR2 designated by the control device 103. Then, the voice signal processing device 102*b* outputs the voice signal filtered by the acoustic filter coefficient qL2 to the speaker 104L2, outputs the voice signal filtered by the acoustic filter coefficient qC2 to the speaker 104C2 and outputs the voice signal filtered by the acoustic filter coefficient qR2 to the speaker 104R2.

The acoustic filter coefficients qL1, qc1, qR1, qL2, qC2 and qR2 are calculated as given by the following equation (3).

$$qC1 = 1 \tag{3}$$

$$qR1 = \frac{(A \cdot H \cdot - D \cdot E)qC1 + (C \cdot H - D \cdot G)qC2}{B \cdot H - D \cdot F}$$

$$qL1 = -\left(\frac{\sin(kd)}{kd}qC1 + \frac{\sin(2kd)}{2kd}qR1\right)$$

-continued $$qC2 = 1$$

$$qR2 = \frac{(B\cdot E\cdot - A\cdot F)qC1 + (B\cdot G - C\cdot F)qC2}{B\cdot H - D\cdot F}$$

$$qL2 = -\left(\frac{\sin(kd)}{kd}qC2 + \frac{\sin(2kd)}{2kd}qR2\right)$$

$$A = (1-n)DL_{C1} - \mathrm{sinc}(kd)DL_{L1}$$

$$B = DL_{R1} - \mathrm{sinc}(2kd)DL_{L1}$$

$$C = (1-n)DL_{C2} - \mathrm{sinc}(kd)DL_{L2}$$

$$D = DL_{R2} - \mathrm{sinc}(2kd)DL_{L2}$$

$$E = (1-n)DR_{C1} - \mathrm{sinc}(kd)DR_{L1}$$

$$F = DR_{R1} - \mathrm{sinc}(2kd)DR_{L1}$$

$$G = (1-n)DR_{C2} - \mathrm{sinc}(kd)DR_{L2}$$

$$H = DR_{R2} - \mathrm{sinc}(2kd)DR_{L2}$$

In the equation (3), n is a multiplication factor of sound pressure energy at a sound increase control point set for each of the first and second speaker groups. DLL1 is a transfer function between the sound increase control point set for the first speaker group and the speaker 104L1. DLC1 is a transfer function between the sound increase control point set for the first speaker group and the speaker 104C1. DLR1 is a transfer function between the sound increase control point set for the first speaker group and the speaker 104R1. DLL2 is a transfer function between the sound increase control point set for the first speaker group and the speaker 104L2. DLC2 is a transfer function between the sound increase control point set for the first speaker group and the speaker 104C2. DLR2 is a transfer function between the sound increase control point set for the first speaker group and the speaker 104R2. DRL1 is a transfer function between the sound increase control point set for the second speaker group and the speaker 104L1. DRC1 is a transfer function between the sound increase control point set for the second speaker group and the speaker 104C1. DRR1 is a transfer function between the sound increase control point set for the second speaker group and the speaker 104R1. DRL2 is a transfer function between the sound increase control point set for the second speaker group and the speaker 104L2. DRC2 is a transfer function between the sound increase control point set for the second speaker group and the speaker 104C2. DRR2 is a transfer function between the sound increase control point set for the second speaker group and the speaker 104R2. In addition, d is an interval between the speakers 104C1, 104R1 and 104L1 and an interval between the speakers 104C2, 104R2 and 104L2.

Figure 12:
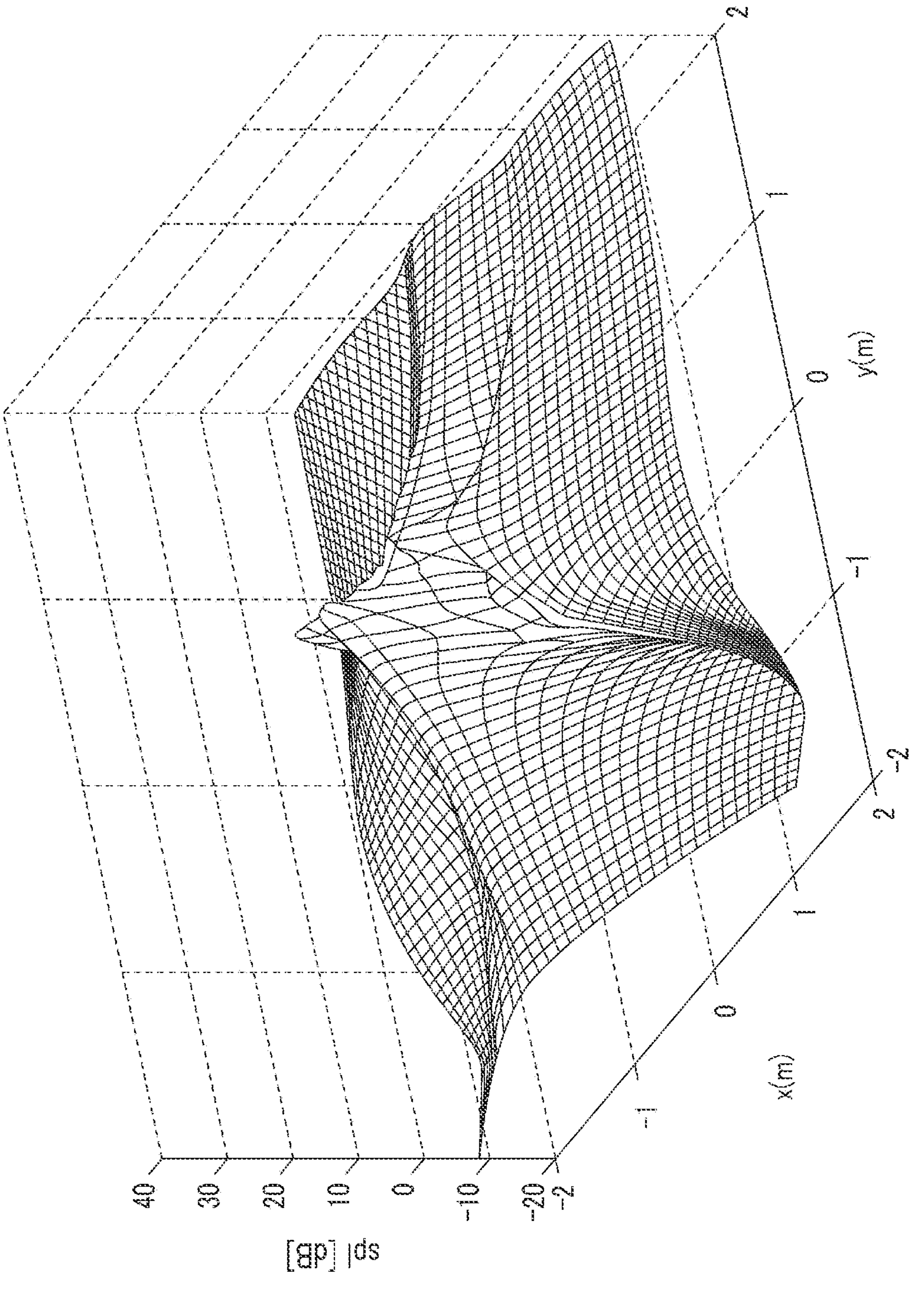
FIG. 12 is a diagram showing gradients of sound pressure levels of a sound increase area and sound decrease areas when sound is radiated using acoustic filter coefficients set in accordance with the results of equation (3).

FIG. 12 shows gradients of the sound pressure levels of the sound increase area and sound decrease areas when sound is radiated using the acoustic filter coefficients set in accordance with the results of the equation (3). FIG. 12 also shows an example in which the distance between the speakers is 0.1 m, the distance between the first and second speaker groups is 0.2 m and the frequency of sound to be radiated sound is 700 Hz. In FIG. 12, the x and y axes are distances from the origin that is an intermediate position between the speakers 104C1 and 104C2, for example. In FIG. 12, the vertical axis represents the sound pressure level.

As described above, the two speaker groups are arranged obliquely from the front to the rear and thus the sound increase areas of the two speaker groups intersect. The sound pressure level increases rapidly at the intersection of the sound increase areas. That is, the directivity of sound is enhanced by arranging the two speaker groups such that their sound increase areas intersect.

Figure 13:
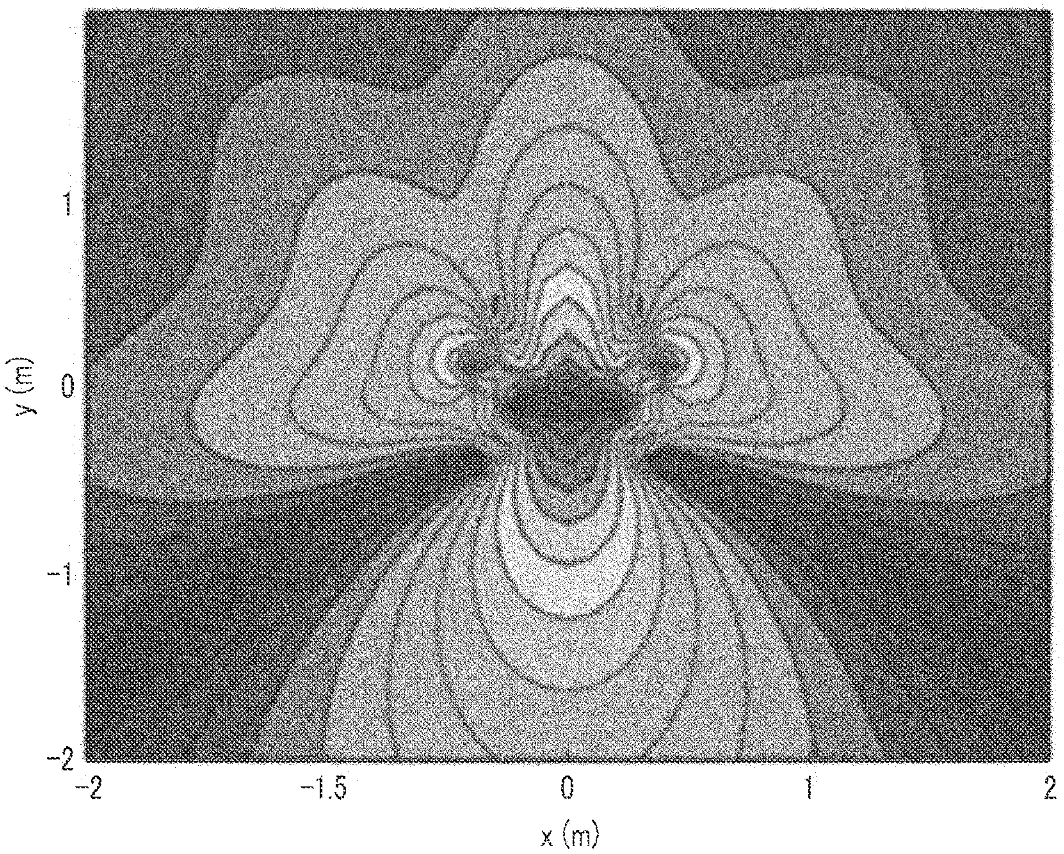
FIG. 13 is a diagram showing an example of the distribution of sound pressure levels when sound is radiated using acoustic filter coefficients set in accordance with the results of equation (3).

FIG. 13 shows an example of the distribution of sound pressure levels when sound is radiated with the acoustic filter coefficients set in accordance with the results of the equation (3). The distribution indicates that the sound pressure level varies according to the concentration As shown in FIG. 13, the sound pressure level in the sound increase area located near the center is particularly high, and there is an area near the sound increase area, in which the sound pressure level rapidly decreases. That is, it can be seen from FIG. 13 that the directivity of sound is more enhanced by arranging two speaker groups such that their sound increase areas intersect.

FIGS. 14A to 14H are diagrams showing measured results of the relationship between the azimuth angle and the sound pressure level in two speaker groups whose arrangement is changed.

Figure 14A:
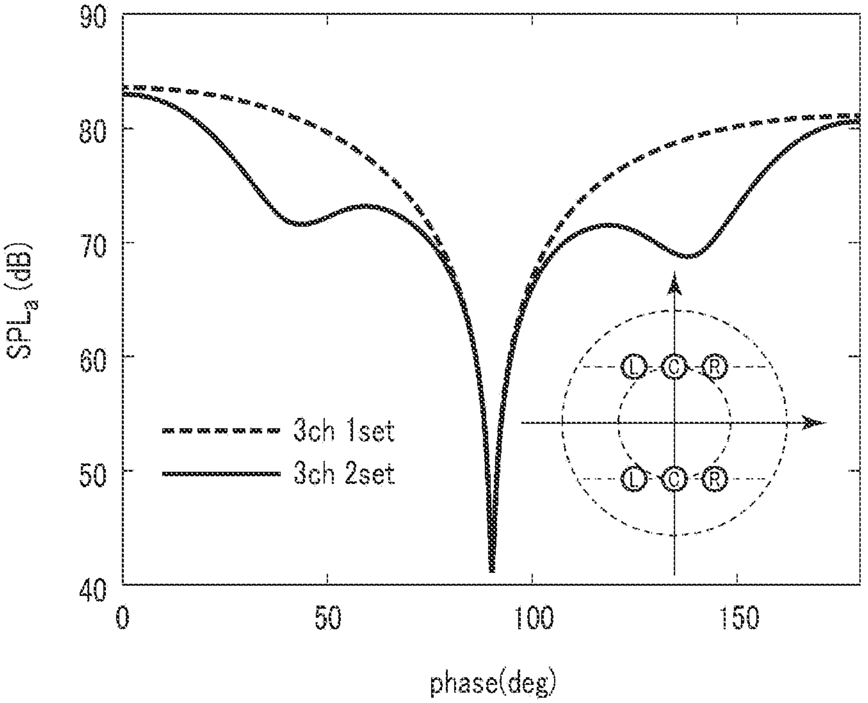
FIG. 14A is a diagram showing a measured result of the relationship between an azimuth angle and a sound pressure level in two speaker groups whose arrangement is changed.
Figure 14B:
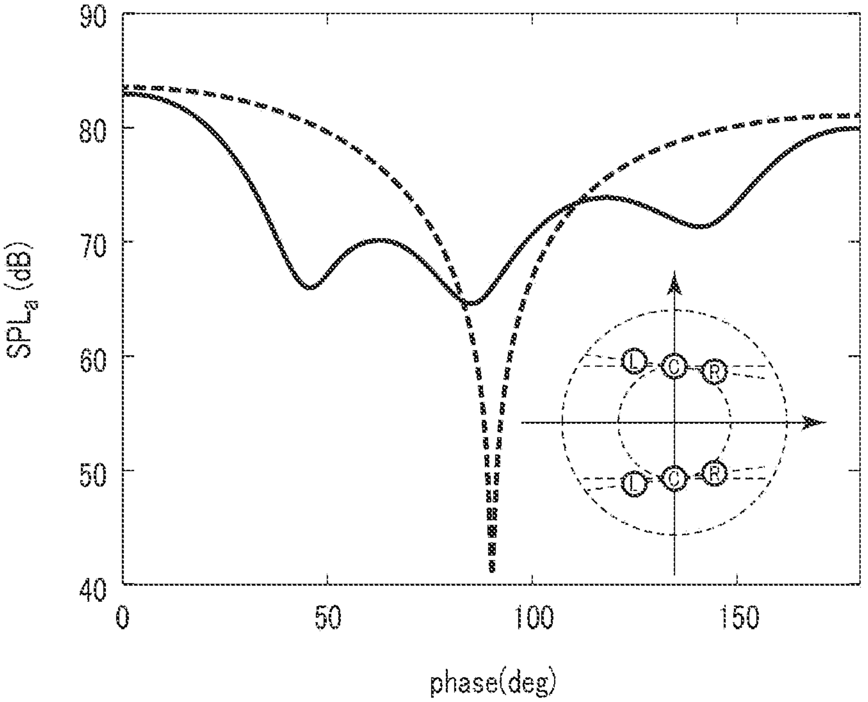
FIG. 14B is a diagram showing a measured result of the relationship between an azimuth angle and a sound pressure level in two speaker groups whose arrangement is changed.
Figure 14C:
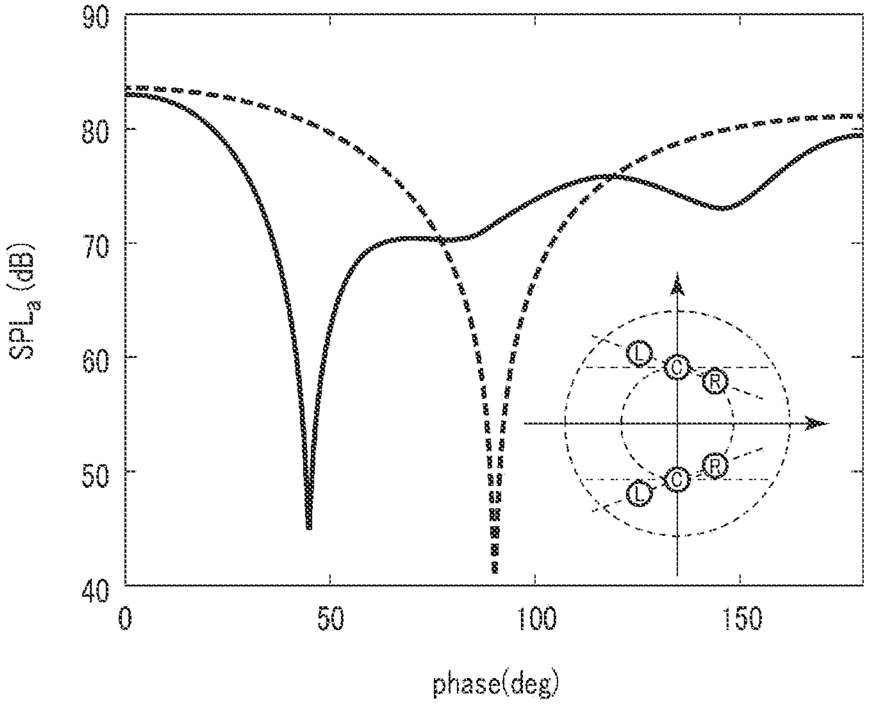
FIG. 14C is a diagram showing a measured result of the relationship between an azimuth angle and a sound pressure level in two speaker groups whose arrangement is changed.
Figure 14D:
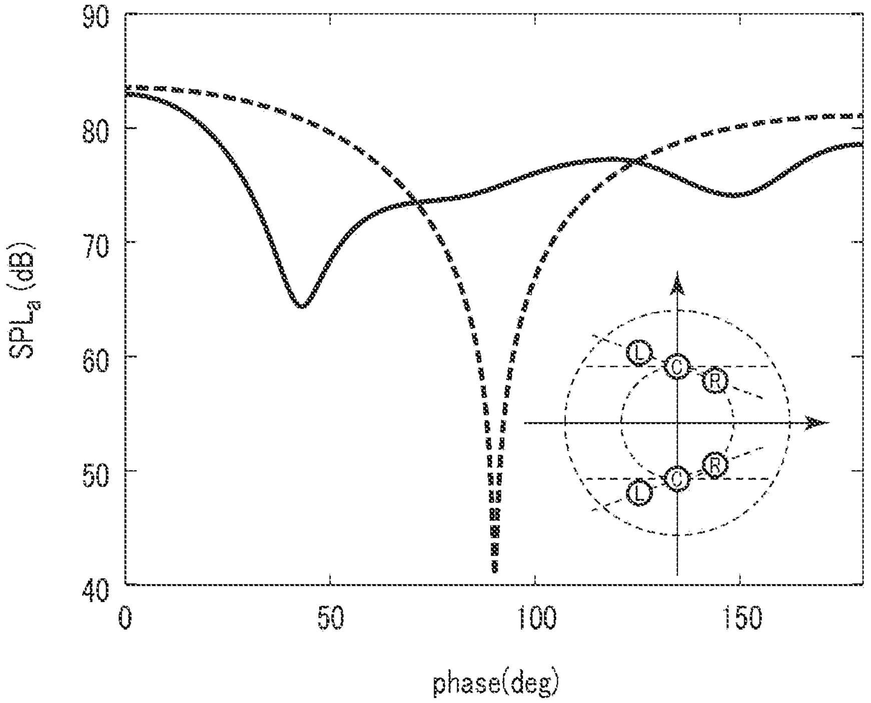
FIG. 14D is a diagram showing a measured result of the relationship between an azimuth angle and a sound pressure level in two speaker groups whose arrangement is changed.
Figure 14E:
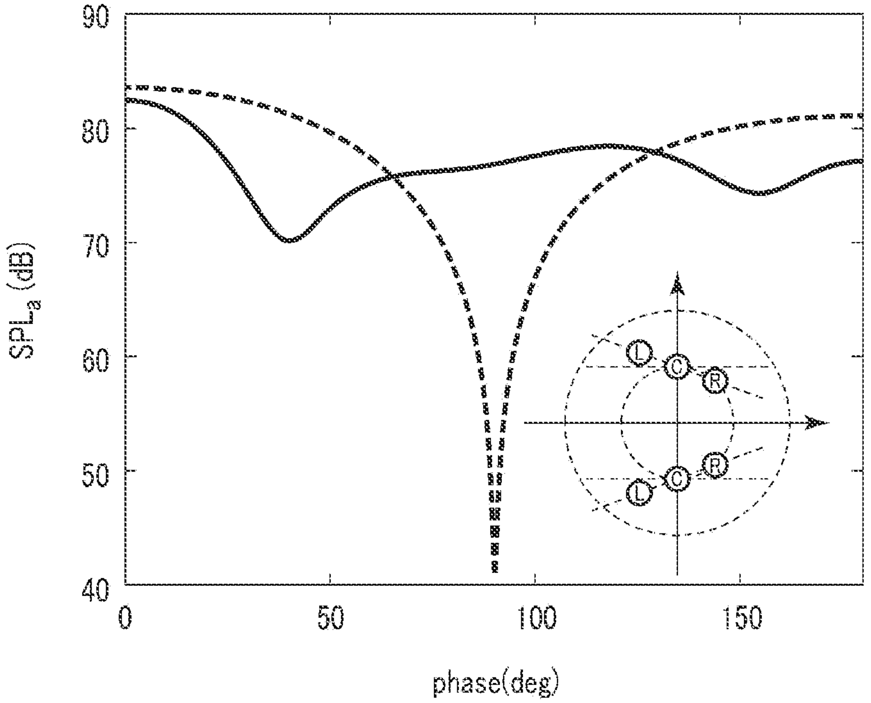
FIG. 14E is a diagram showing a measured result of the relationship between an azimuth angle and a sound pressure level in two speaker groups whose arrangement is changed.
Figure 14F:
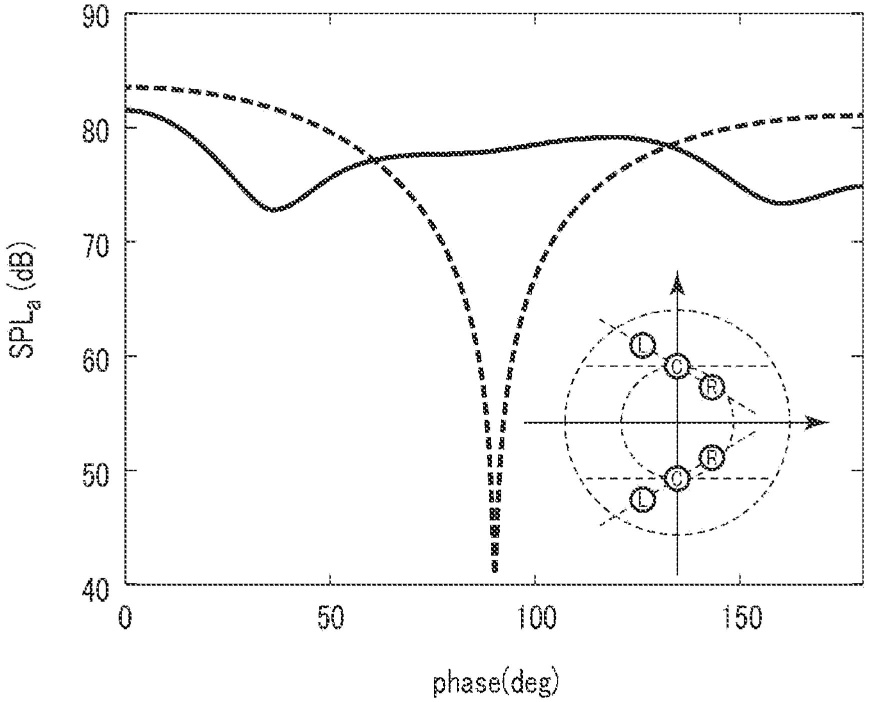
FIG. 14F is a diagram showing a measured result of the relationship between an azimuth angle and a sound pressure level in two speaker groups whose arrangement is changed.
Figure 14G:
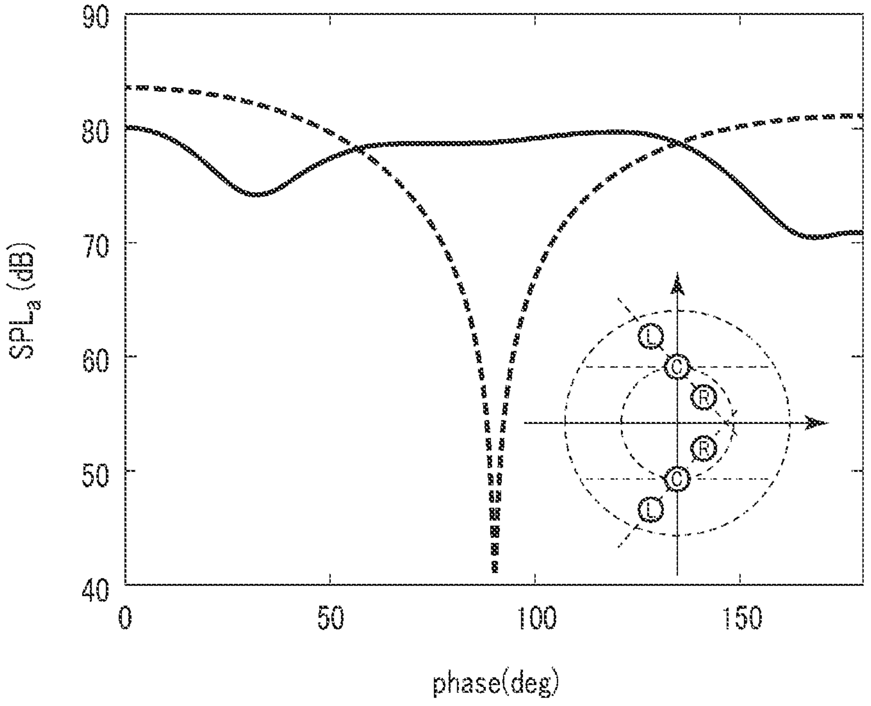
FIG. 14G is a diagram showing a measured result of the relationship between an azimuth angle and a sound pressure level in two speaker groups whose arrangement is changed.
Figure 14H:
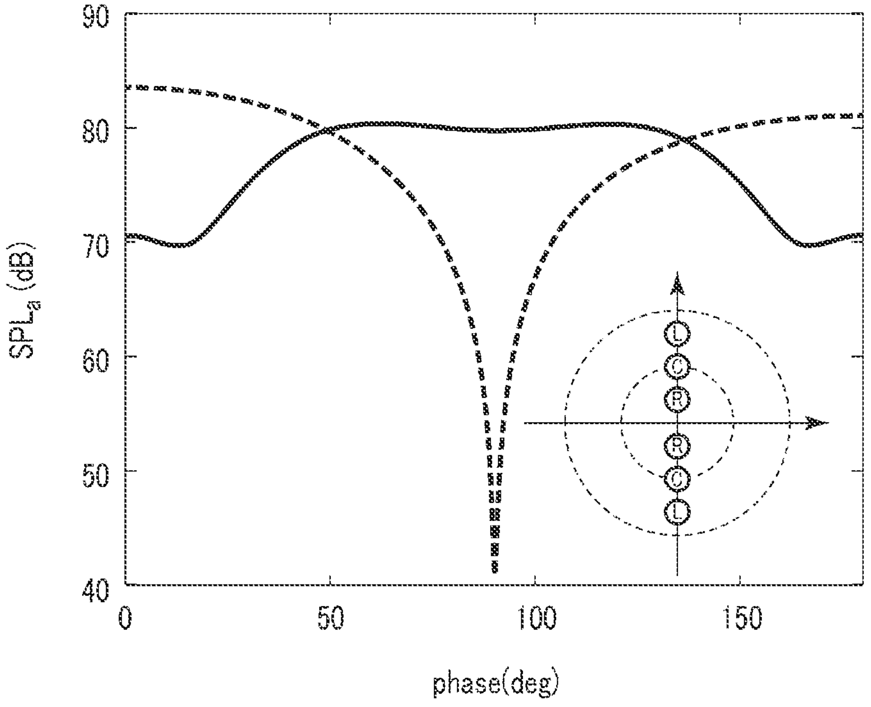
FIG. 14H is a diagram showing a measured result of the relationship between an azimuth angle and a sound pressure level in two speaker groups whose arrangement is changed.
Figure 15A:
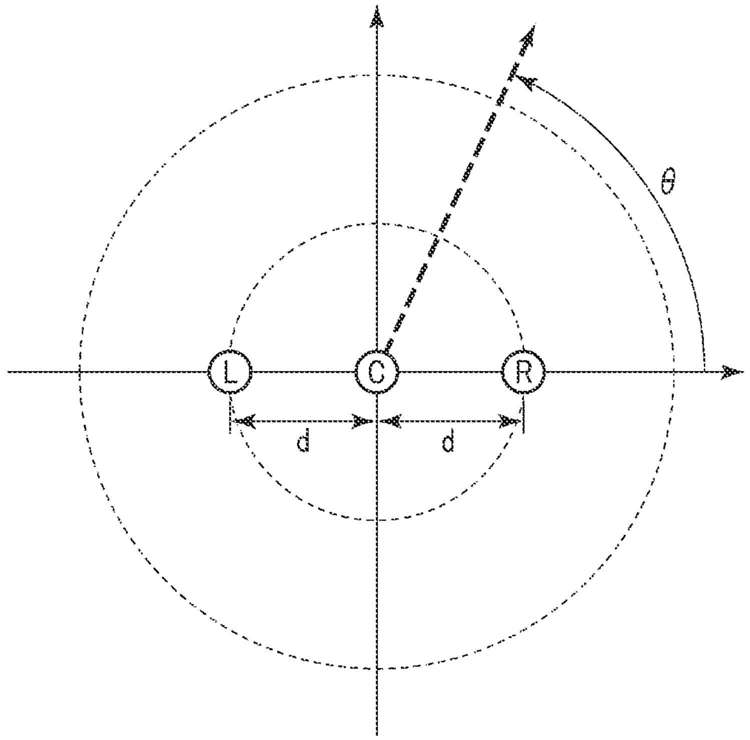
FIG. 15A is a diagram showing an example of a speaker group of 3ch 1set.

In FIGS. 14A to 14H, 3ch 1set represents the measured result of the relationship between the azimuth angle and the sound pressure level in a single speaker group shown in FIG. 15A. In FIG. 15A, the speakers 104L, 104C and 104R are installed at their respective positions L, C and R in FIG. 15A. The speaker interval d is 0.1 m. The azimuth angle θ is an angle relative to the speaker 104C. The sound increase control point is set to 0° azimuth. The result of 3ch 1set is shown for comparison and is unchanged in FIGS. 14A to 14H. Specifically, the sound pressure level in 0° azimuth that is the sound increase area is the highest, and the sound pressure level in 90° azimuth is the lowest. The sound pressure level in 180° azimuth that is opposite to the sound increase area is made lower than that in 0° azimuth.

Figure 15B:
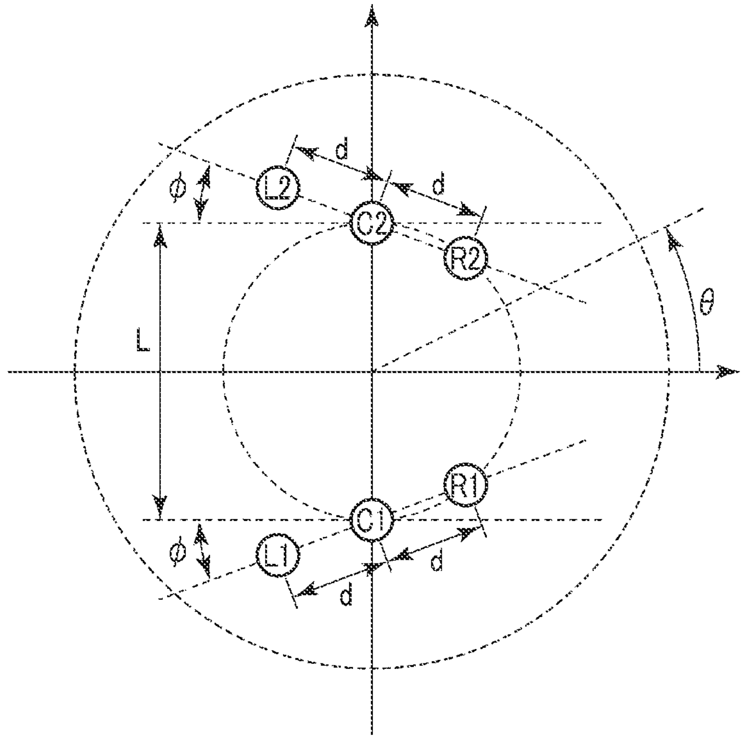
FIG. 15B is a diagram showing an example of a speaker group of 3ch 2set.

In FIGS. 14A to 14H, 3ch 2set represents the measured result of the relationship between the azimuth angle and the sound pressure level in two speaker groups shown in FIG. 15B when they are changed in arrangement. In FIG. 15B, the speakers 104L1, 104C1 and 104R1 are installed at their respective positions L1, C1 and R1, and the speakers 104L2, 104C2 and 104R2 are installed at their respective positions L2, C2 and R2. The speaker interval d is 0.1 m. The azimuth angle θ is an angle relative to an intermediate position between the speakers 104C1 and 104C2. In addition, the inclination angles φ of the first and second speaker groups are angles of the speakers 104R1 and 104L1 to the speaker 104C1 and the angles of the speakers 104R2 and 104L2 to the speaker 104C2. FIG. 14A shows a result where φ is 0°. FIG. 14B shows a result where φ is 10°. FIG. 14C shows a result where φ is 15°. FIG. 14D shows a result where φ is 20°. FIG. 14E shows a result where φ is 30°. FIG. 14E shows a result where φ is 40°. FIG. 14F shows a result where φ is 50°. FIG. 14G shows a result where φ is 60°. FIG. 14H shows a result where φ is 90°.

In each of FIGS. 14A to 14H, the amount of decrease in sound pressure level with respect to a change in azimuth angle in the result of 3ch 2set is larger than that in the result of 3ch 1set. Since the 0° azimuth corresponds to the sound increase area as described above, a decrease in the sound pressure level other than the 0° azimuth means that a gradient of a large sound pressure level is created within a narrow range. That is, it can be seen from FIGS. 14A to 14H that the directivity of sound is enhanced by spacing the two speaker groups.

If the results of 3ch 1set are compared among FIGS. 14A to 14H, the sound pressure level decreases significantly, especially in FIG. 14C, i.e., when φ is 15°. In the measurement conditions of FIGS. 14A to 14H, therefore, φ is 15° as the optimum inclination angle. However, the actual optimum inclination angle also depends on the setting of the sound increase control points and the characteristics of the calculated acoustic filters, and 15° is not necessarily optimum. An angle (2φ) between a straight line on which the first speaker group is located and a straight line on which the second speaker group is located is, for example, greater than 0° and less than or equal to 180°. The intersection of the two straight lines is closer to the speaker 104R1 than the speaker 104L1 and closer to the speaker 104R2 than the speaker 104L2.

Figure 16:
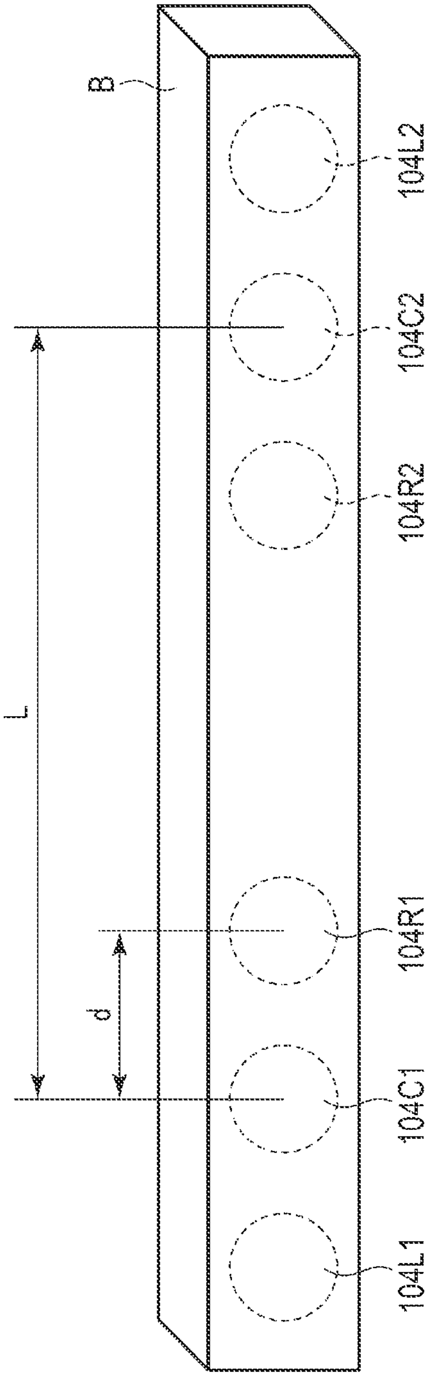
FIG. 16 is an external view showing a speaker group embedded in a baffle plate.

If the optimum inclination angle is determined, the first and second speaker groups can be inclined and spaced apart by the inclination angle. At this time, as shown in FIG. 16, the speakers 104R1, 104C1 and 104L1 of the first speaker group and the speakers 104R2, 104C2 and 104L2 of the second speaker group can be embedded and arranged in a baffle plate B. If the speaker groups are spaced apart as shown in FIG. 13, the sound pressure level in the rear is also high in addition to the front. The distribution of high sound pressure levels in the rear is canceled by embedding the speakers in the baffle plate B. Furthermore, the baffle plate only doubles the pressure of radiated sound, and the advantages of sound increase control and acoustic power minimization control are the same as those without the baffle plate.

Figure 17A:
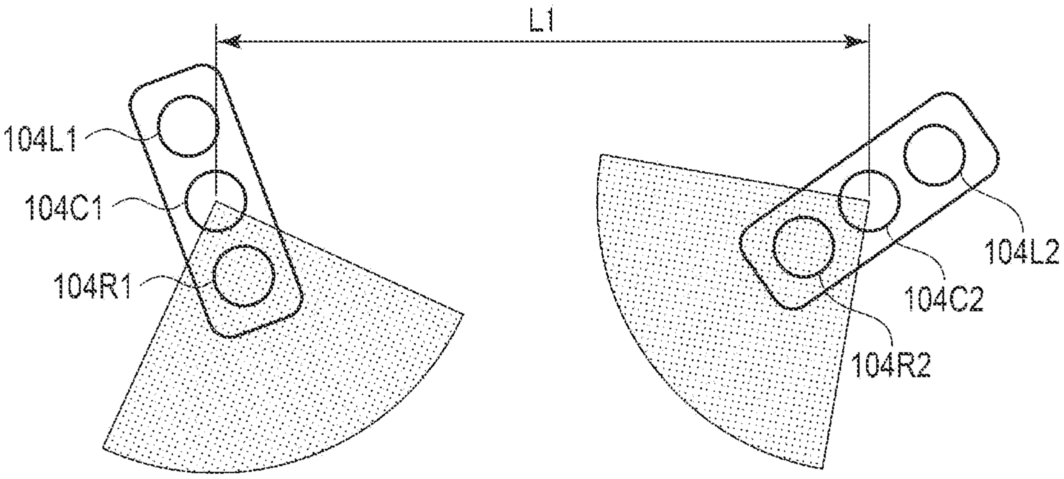
FIG. 17A is a conceptual diagram to search for the arrangement of a plurality of speaker groups having an optimum directivity.
Figure 17B:
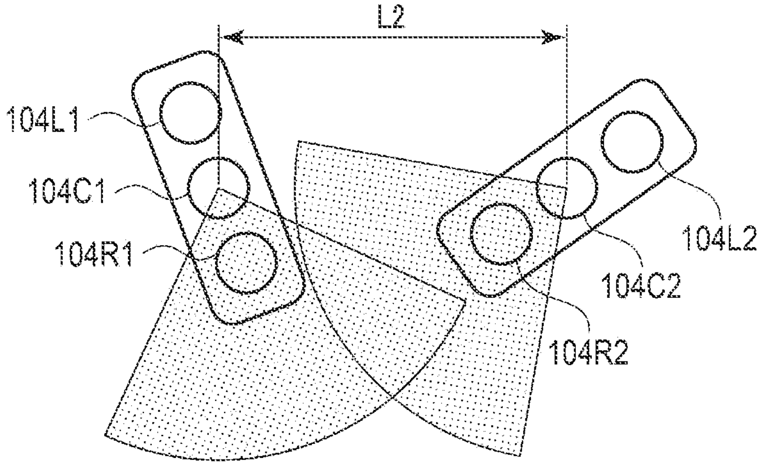
FIG. 17B is a conceptual diagram to search for the arrangement of a plurality of speaker groups having an optimum directivity.

The equation (3) represents an acoustic filter coefficient calculated by taking into account the transmission characteristics of sound radiated from a speaker of one speaker group to a sound increase control point of another speaker group. As a simpler method, two speaker groups are arranged whose acoustic filter coefficients are calculated independently on the basis of the equation (1) to improve the directivity of sound. FIGS. 17A and 17B are conceptual diagrams to search for the arrangement of a plurality of speaker groups having an optimum directivity. A user causes each of two speaker groups to radiate sound while changing a distance L between the two speaker groups and an inclination angle, and listens to the sound from each of the speaker groups. If the distance L is a long distance L1 as shown in FIG. 17A, the sound increase areas of the two speaker groups do not overlap, so that the volume of the sound heard by the user does not change much. On the other hand, if the distance L is a short distance L2 as shown in FIG. 17B, the sound increase areas of the two speaker groups overlap, and the volume of the sound heard by the user increases. If the distance L satisfies the condition $kL<\pi$, it has been found by the applicant's experiment that a great sound increase advantage can be obtained from the fact that the sound increase areas overlap.

With the foregoing search method, the user can install two speaker groups such that he or she can hear the loudest sound while listening to sound. In this method, no acoustic filter coefficients need to be recalculated.

As described above, according to the second embodiment, the directivity of sound is enhanced by spacing two speaker groups. That is, a more localized sound increase area can be set.

In the second embodiment, the speakers of each speaker group are three speakers arranged on a straight line. However, the speakers of each speaker group need not necessarily be three speakers arranged on a straight line. For example, each speaker group may include four speakers including two speakers arranged vertically as described with reference to FIG. 1 of the first embodiment. That is, the speakers of each speaker group may include at least two speakers.

Modification 1 to Second Embodiment

In the example shown in FIG. 11, the same voice signal that is filtered by different acoustic filters is input to the first and second speaker groups. Thus, the sound heard at the sound increase control point is a monaural sound. In contrast, the second embodiment can be applied to a stereo system.

Figure 18:
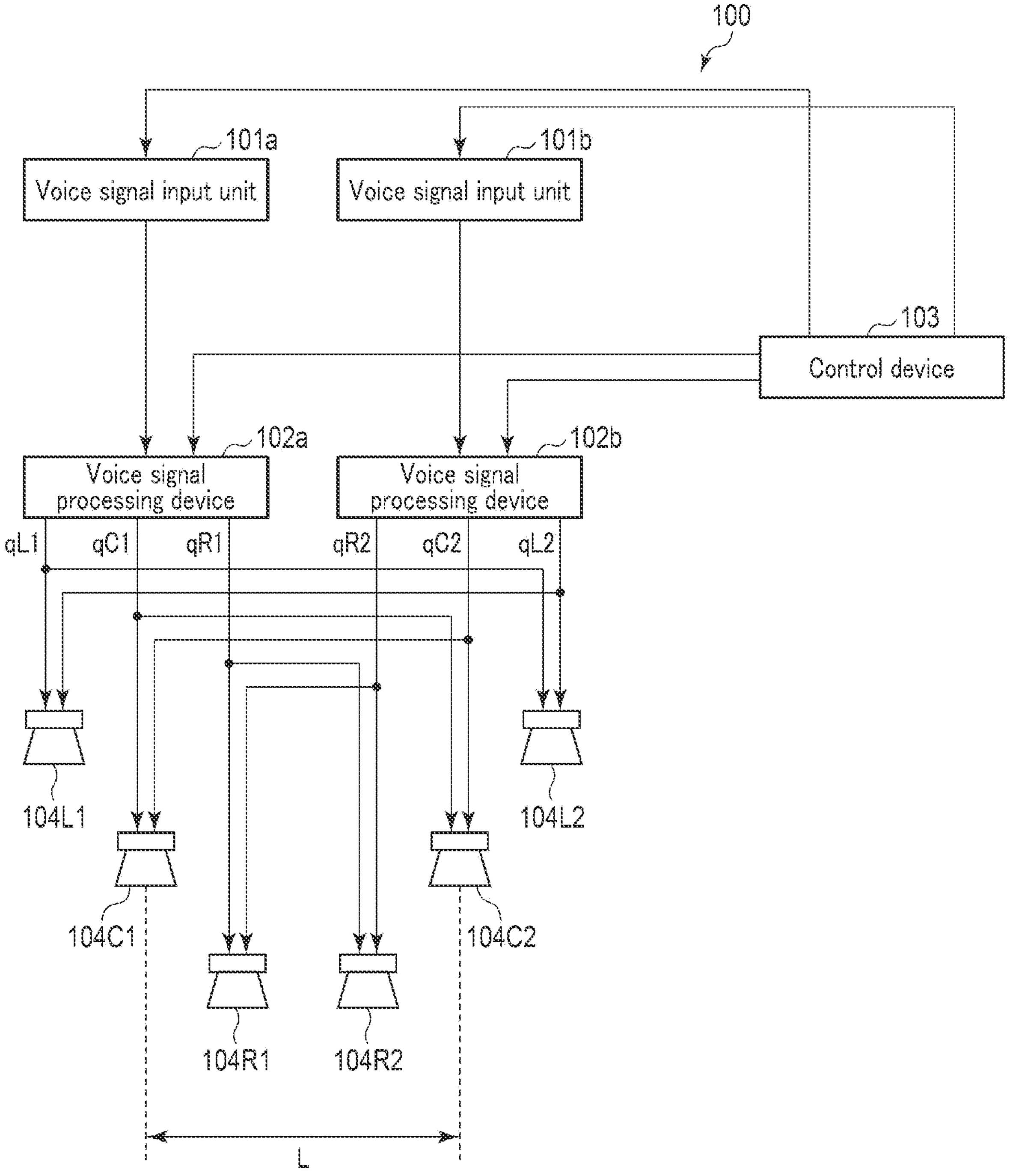
FIG. 18 is a diagram showing an example of the configuration of an acoustic control apparatus according to modification 1 to the second embodiment.

FIG. 18 is a diagram showing an example of the configuration of an acoustic control apparatus according to modification 1 to the second embodiment. The acoustic control apparatus 100 includes voice signal input units 101*a* and 101*b*, voice signal processing units 102*a* and 102*b*, a control device 103, a first speaker group and a second speaker group.

The first and second speaker groups are the same as those in FIG. 11. That is, in the first speaker group, the speakers 104R1, 104C1 and 104L1 are arranged obliquely in this order from the front to the rear. In the second speaker group, the speakers 104R2, 104C2 and 104L2 are obliquely arranged in this order from the front to the rear.

In modification 2, two voice signal input units 101*a* and 101*b* are provided. The voice signal input unit 101*a* inputs one of the stereo voice signals, for example, a right voice signal, to the voice signal processing device 102*a*. The voice signal input unit 101*b* inputs the other stereo voice signal, for example, a left voice signal, to the voice signal processing device 102*b*. The stereo voice signals may be generated in sequence each time it is reproduced or may be input, for example, by a user or the control device 103.

The voice signal processing device 102*a* has the same structure as that of the voice signal processing device 102 shown in FIG. 3 to filter the voice signals input from the voice signal input unit 101*a* in accordance with the acoustic filter coefficients qL1, qC1 and qR1 designated by the control device 103. Then, the voice signal processing device 102*a* outputs the voice signal filtered by the acoustic filter coefficient qL1 to the speakers 104L1 and 104L2, outputs the voice signal filtered by the acoustic filter coefficient qC1 to the speakers 104C1 and 104C2, and outputs the voice signal filtered by the acoustic filter coefficient qR1 to the speakers 104R1 and 104R2. That is, in modification 2, the voice signal processing device 102*a* outputs filtered voice signals to both the first and second speaker groups.

The voice signal processing device 102*b* has the same configuration as that of the voice signal processing device 102 shown in FIG. 3 to filter the voice signals input from the voice signal input unit 101*b* in accordance with the acoustic filter coefficients qL2, qC2 and qR2 designated by the control device 103. The voice signal processing device 102*b* outputs the voice signal filtered by the acoustic filter coefficient qL2 to the speakers 104L2 and 104L1, outputs the voice signal filtered by the acoustic filter coefficient qC2 to the speakers 104C2 and 104C1, and outputs the voice signal filtered by the acoustic filter coefficient qR2 to the speakers 104R2 and 104R1. That is, in modification 2, the voice signal processing device 102*b* outputs the filtered voice signals to both the first and second speaker groups.

The acoustic filter coefficients qL1, qC1, qR1, qL2, qC2 and qR2 may be the same acoustic filter coefficients as given by the equation (3).

In the configuration of modification 2 according to the second embodiment described above, the advantage obtained by spacing the two speaker groups while maintaining the advantage of the monaural sound source is combined with a stereo sound image advantage. Thus, the spatial directivity distribution of stereo sound sources is achieved.

Figure 19:
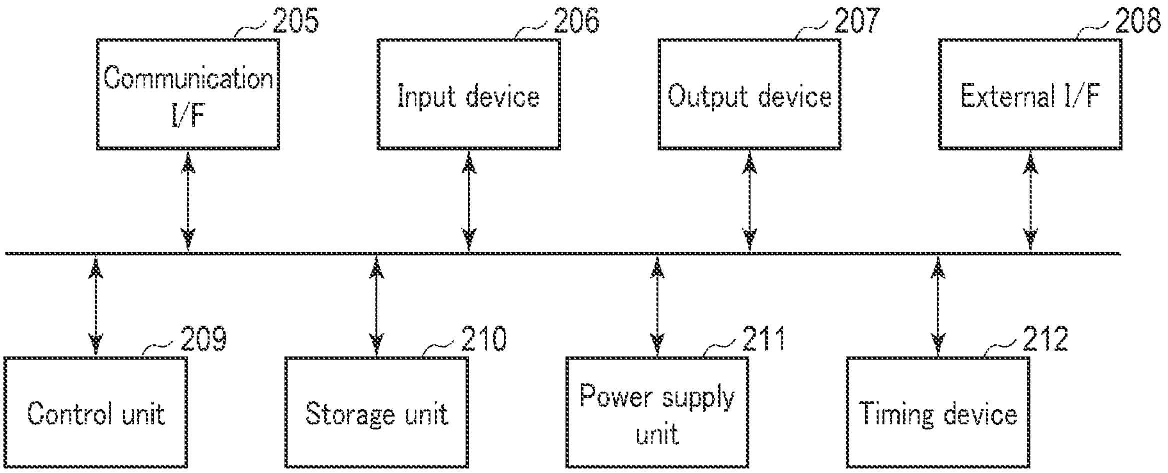
FIG. 19 is a diagram showing an example of a hardware configuration of an acoustic control apparatus.

An example of a hardware configuration of the acoustic control apparatus 100 described in each of the foregoing embodiments will be described below with reference to FIG. 19. FIG. 19 is a diagram showing an example of the hardware configuration of the acoustic control apparatus 100.

As shown in FIG. 19, the acoustic control apparatus includes a computer to which a control unit 209, a storage unit 210, a power supply unit 211, a timing device 212, a communication interface (I/F) 205, an input unit 206, an output device 207 and an external interface (I/F) 208 are electrically connected.

The control unit 209 includes, for example, a central processing unit (CPU), a random access memory (RAM), and/or a read only memory (ROM) to control each component in accordance with information processing. The control unit 209 may operate as a voice signal input unit 101, a voice signal processing device 102 and a control device 103. The control unit 209 may read an execution program stored in the storage unit 210 to perform a process.

The storage unit 210 is a medium that stores information such as programs so that it can be read by a computer, a machine and the like. The storage unit 210 can store information of a speaker interval, information of the frequency of a voice signal, and information of a transfer function. The storage unit 210 may be, for example, an auxiliary storage device such as a hard disk drive and a solid state drive. The storage unit 210 may also include a drive. The drive is a device that reads data from another auxiliary storage device, a recording medium, and the like, and includes, for example, a semiconductor memory drive (flash memory drive), a compact disk CD) drive, and a digital versatile disk (DVD) drive. The type of the drive may be selected as appropriate in accordance with the type of the storage medium.

The power supply unit 211 supplies power to each element of the acoustic control apparatus 100. The power supply unit 211 may also supply power to each element of a device including the acoustic control apparatus 100. The power supply 211 may include, for example, a secondary battery or an AC power supply.

The timing device 212 is a device that measures time. The timing device 212 may be, for example, a clock including a calendar, and provides the control unit 209 with information of the current year and month and/or date and time. The timing device 212 may be used to date and time a voice signal to be reproduced.

The communication interface 205 is, for example, a near-field communication (e.g., Bluetooth (registered trademark)) module, a wired local area network LAN) module, a wireless LAN module, or the like, and is an interface that performs wired or wireless communications via a network. Note that the network may be an internetwork including the Internet or other types of network such as an in-house LAN. In addition, the communication interface 205 may perform one-to-one communication using a universal serial bus (USB) cable or the like. The communication interface 205 may also include a micro USB connector. The communication interface 205 is an interface that connects an acoustic control apparatus to an external device such as electric devices of automobiles, trains and houses, and various types of communication devices. The communication interface 205 is controlled by the control unit 209 and receives various types of information from an external device via a network or the like. The various types of information include, for example, speaker interval information, voice signal frequency information and transfer function information, which are set in an external device.

The input unit 206 is a device that receives input signals, and may be, for example, a touch panel, a physical button, a mouse and a keyboard. The output device 207 is a device that outputs information by display, voice, and the like, such as a display and a speaker. The speaker interval information, voice signal frequency information and transfer function information may be input through the input unit 206.

The external interface 208 mediates between the main body of the acoustic control apparatus and the external device. The external device may be, for example, a printer, a memory and a communication device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An acoustic control apparatus comprising a processor including hardware configured to: calculate acoustic filter coefficients which are smaller in number than a plurality of sound sources, based on a first relational expression between acoustic filters applied to a voice signal containing information of voice reproduced by each of the sound sources, which is based on a sound increase control law that increases voice pressure at a sound increase control point by voices reproduced by the sound sources, and a second relational expression between the acoustic filters, which is based on an acoustic power minimization control law that minimizes acoustic power for voices reproduced by the sound sources; and apply the calculated acoustic filter coefficients to an input voice signal, and branch a voice signal to which a common acoustic filter coefficient is applied, into at least two of the sound sources;

wherein an acoustic filter filters a voice signal output from an amplifier in accordance with the acoustic filter coefficient; and wherein the acoustic filter transmits only the sound in a specific band of the voice signal.

2. The acoustic control apparatus of claim 1, wherein:

the sound sources include a plurality of sound sources arranged on a straight line and a plurality of sound sources arranged out of the straight line; and the processor outputs the voice signal to which the common acoustic filter coefficient is applied, to the sound sources arranged out of the straight line.

3. The acoustic control apparatus of claim 1, wherein:

the sound sources include a first sound source arranged in a center and a plurality of second sound sources arranged at equal distances from the first sound source; and the processor outputs the voice signal to which the common acoustic filter coefficient is applied, to at least two of the second sound source.

4. An acoustic control apparatus comprising a processor including hardware configured to:

calculate acoustic filter coefficients based on a first relational expression between acoustic filters applied to a voice signal containing information of voice reproduced by each of a plurality of sound sources, which is based on a sound increase control law that increases voice pressure at a sound increase control point by voices reproduced by the sound sources, and a second relational expression between the acoustic filters, which is based on an acoustic power minimization control law that minimizes acoustic power for voices reproduced by the sound sources; and apply the calculated acoustic filter coefficients to an input voice signal and output the voice signal to which the calculated acoustic filter coefficients are applied, to the sound sources, wherein the sound sources are arranged apart from each other, include a first sound source group and a second sound source group each of which includes at least two sound sources;

wherein an acoustic filter filters a voice signal output from an amplifier in accordance with the acoustic filter coefficient; and wherein the acoustic filter transmits only the sound in a specific band of the voice signal.

5. The acoustic control apparatus of claim 4, wherein:

the sound increase control point is set in each of the first sound source group and the second sound source group; and the first sound source group and the second sound source group are arranged such that a first sound increase area including the sound increase control point of the first sound source group and a second sound increase area including the sound increase control point of the second sound source group intersect each other.

6. The acoustic control apparatus of claim 4, wherein the two sound sources included in the first sound source group and the two sound sources included in the second sound source group are arranged on a straight line.

7. A non-transitory computer-readable storage medium which stores an acoustic control program to cause a computer to: calculate acoustic filter coefficients which are smaller in number than a plurality of sound sources, based on a first relational expression between acoustic filters applied to a voice signal containing information of voice reproduced by each of the sound sources, which is based on a sound increase control law that increases voice pressure at a sound increase control point by voices reproduced by the sound sources, and a second relational expression between the acoustic filters, which is based on an acoustic power minimization control law that minimizes acoustic power for voices reproduced by the sound sources; and apply the calculated acoustic filter coefficients to an input voice signal; and branch a voice signal to which a common acoustic filter coefficient is applied, into at least two of the sound sources;

wherein an acoustic filter filters a voice signal output from an amplifier in accordance with the acoustic filter coefficient; and wherein the acoustic filter transmits only the sound in a specific band of the voice signal.

8. A non-transitory computer-readable storage medium which stores an acoustic control program to cause a computer to: calculate acoustic filter coefficients based on a first relational expression between acoustic filters applied to a voice signal containing information of voice reproduced by each of a plurality of sound sources arranged apart from each other and including a first sound source group and a second sound source group each including at least two sound sources, the first relational expression being based on a sound increase control law that increases voice pressure at a sound increase control point by voices reproduced by the sound sources, and a second relational expression between the acoustic filters, which is based on an acoustic power minimization control law that minimizes acoustic power for voices reproduced by the sound sources; and apply the calculated acoustic filter coefficients to an input voice signal; and output a voice signal to which a common acoustic filter coefficient is applied, to the sound sources of each of the first sound source group and the second sound source group;

wherein an acoustic filter filters a voice signal output from an amplifier in accordance with the acoustic filter coefficient; and wherein the acoustic filter transmits only the sound in a specific band of the voice signal.

9. An acoustic control method comprising: calculating acoustic filter coefficients which are smaller in number than a plurality of sound sources, based on a first relational expression between acoustic filters applied to a voice signal containing information of voice reproduced by each of the sound sources, which is based on a sound increase control law that increases voice pressure at a sound increase control point by voices reproduced by the sound sources, and a second relational expression between the acoustic filters, which is based on an acoustic power minimization control law that minimizes acoustic power for voices reproduced by the sound sources; and applying the calculated acoustic filter coefficients to an input voice signal; and branching a voice signal to which a common acoustic filter coefficient is applied, into at least two of the sound sources;

wherein an acoustic filter filters a voice signal output from an amplifier in accordance with the acoustic filter coefficient; and wherein the acoustic filter transmits only the sound in a specific band of the voice signal.

10. An acoustic control method comprising: calculating acoustic filter coefficients based on a first relational expression between acoustic filters applied to a voice signal containing information of voice reproduced by each of a plurality of sound sources arranged apart from each other and including a first sound source group and a second sound source group each in at least two sound sources, the first relational expression being based on a sound increase control law that increases voice pressure at a sound increase control point by voices reproduced by the sound sources, and a second relational expression between the acoustic filters, which is based on an acoustic power minimization control law that minimizes acoustic power for voices reproduced by the sound sources; and applying the calculated acoustic filter coefficients to an input voice signal; and outputting a voice signal to which a common acoustic filter coefficient is applied, to the sound sources of each of the first sound source group and the second sound source group;

wherein an acoustic filter filters a voice signal output from an amplifier in accordance with the acoustic filter coefficient; and wherein the acoustic filter transmits only the sound in a specific band of the voice signal.

* * * * *